(12) United States Patent
Carin et al.

(10) Patent No.: US 7,975,398 B2
(45) Date of Patent: Jul. 12, 2011

(54) PROCESS AND SYSTEM FOR DRYING AND HEAT TREATING MATERIALS

(75) Inventors: Christianne Carin, Priddis (CA); Brian N. Gorbell, Priddis (CA); Christianne Carin, legal representative, Priddis (CA); Alvin W. Fedkenheuer, Calgary (CA); John S. Jonasson, Tisdale (CA); Alexander Starosud, Calgary (CA)

(73) Assignee: EarthRenew, Inc., Half Moon Bay, CA (US)

( * ) Notice: Subject to any disclaimer, the term of this patent is extended or adjusted under 35 U.S.C. 154(b) by 371 days.

(21) Appl. No.: 11/928,406

(22) Filed: Oct. 30, 2007

(65) Prior Publication Data

US 2008/0110043 A1 May 15, 2008

Related U.S. Application Data

(62) Division of application No. 11/184,738, filed on Jul. 18, 2005, now Pat. No. 7,685,737.

(60) Provisional application No. 60/589,360, filed on Jul. 19, 2004.

(51) Int. Cl.
*F26B 19/00* (2006.01)

(52) U.S. Cl. ....... 34/60; 34/80; 34/90; 34/204; 110/346; 60/781; 210/781

(58) Field of Classification Search ................ 34/60, 80, 34/90, 204; 110/346; 210/173; 60/781
See application file for complete search history.

(56) References Cited

U.S. PATENT DOCUMENTS

| | | | |
|---|---|---|---|
| 3,050,383 A | 8/1962 | Wilson | |
| 3,262,214 A | 7/1966 | Webb | |
| 3,269,824 A | 8/1966 | Aswell | |
| 3,285,704 A | 11/1966 | Sackett, Sr. | |
| 3,463,612 A | 8/1969 | Whitsel, Jr. | |
| 3,564,723 A | 2/1971 | Pasey | |
| 3,589,313 A | 6/1971 | Smith et al. | |
| 3,645,006 A | 2/1972 | Anderson | |
| 3,667,131 A | 6/1972 | Stephanoff | |
| 3,668,785 A | 6/1972 | Rodwin | |
| 3,735,600 A * | 5/1973 | Dowdell et al. | 62/619 |
| 3,749,162 A * | 7/1973 | Anders | 166/354 |

(Continued)

FOREIGN PATENT DOCUMENTS

CH          641891          3/1984

(Continued)

OTHER PUBLICATIONS

How Milorganite is Made, 1 page (Aug. 4, 2004).

(Continued)

*Primary Examiner* — Stephen M. Gravini
(74) *Attorney, Agent, or Firm* — Merchant & Gould P.C.

(57) ABSTRACT

This invention discloses systems and methods for conversion of high moisture waste materials to dry or low moisture products for recycle or reuse. The equipment systems comprise a gas turbine generator unit (preferred heat source), a dryer vessel and a processing unit, wherein the connection between the gas turbine and the dryer vessel directs substantially all the gas turbine exhaust into the dryer vessel and substantially precludes the introduction of air into the dryer vessel and wherein the processing unit forms the dried material from the dryer vessel into granules, pellets or other desired form for the final product. Optionally, the systems and methods further provide for processing ventilation air from manufacturing facilities to reduce emissions therefrom.

5 Claims, 5 Drawing Sheets

U.S. PATENT DOCUMENTS

| | | | |
|---|---|---|---|
| 3,783,527 A | 1/1974 | Driscoll et al. | |
| 3,805,715 A | 4/1974 | Keller | |
| 3,866,411 A | 2/1975 | Marion et al. | |
| 3,868,817 A | 3/1975 | Marion et al. | |
| 3,905,796 A | 9/1975 | Ghelfi | |
| 3,926,743 A | 12/1975 | Cywin | |
| 3,993,458 A | 11/1976 | Antal, Jr. | |
| 3,997,388 A | 12/1976 | Simon | |
| 4,007,786 A | 2/1977 | Schlinger | |
| 4,028,030 A | 6/1977 | Imhof | |
| 4,032,305 A | 6/1977 | Squires | |
| 4,043,393 A * | 8/1977 | Fisher et al. | 166/248 |
| 4,058,590 A * | 11/1977 | Ruble | 423/456 |
| 4,075,831 A | 2/1978 | McGann | |
| 4,082,532 A | 4/1978 | Imhof | |
| 4,099,336 A | 7/1978 | Maffet | |
| 4,121,349 A | 10/1978 | Maffet | |
| 4,121,912 A | 10/1978 | Barber et al. | |
| 4,126,668 A | 11/1978 | Erickson | |
| 4,128,946 A | 12/1978 | Maffet | |
| 4,132,065 A | 1/1979 | McGann | |
| 4,137,648 A | 2/1979 | Rhodes | |
| 4,158,680 A * | 6/1979 | McGann | 261/149 |
| 4,160,479 A * | 7/1979 | Richardson et al. | 166/267 |
| 4,164,124 A | 8/1979 | Taylor et al. | |
| 4,172,857 A | 10/1979 | Pavilon | |
| 4,184,322 A | 1/1980 | Paull et al. | |
| 4,220,463 A | 9/1980 | Van Hijfte et al. | |
| 4,223,666 A * | 9/1980 | Wasserman | 126/618 |
| 4,247,302 A | 1/1981 | Woldy et al. | |
| 4,248,604 A | 2/1981 | Woldy et al. | |
| 4,255,232 A | 3/1981 | Ries | |
| 4,308,463 A | 12/1981 | Giras et al. | |
| 4,321,151 A * | 3/1982 | McMullen | 210/769 |
| 4,353,207 A | 10/1982 | Lee | |
| 4,402,710 A | 9/1983 | Stellaccio | |
| 4,424,766 A * | 1/1984 | Boyle | 122/4 D |
| 4,430,046 A * | 2/1984 | Cirrito | 417/55 |
| 4,436,531 A | 3/1984 | Estabrook et al. | |
| 4,454,427 A | 6/1984 | Sosnowski et al. | |
| 4,469,488 A | 9/1984 | Calderon | |
| 4,472,363 A | 9/1984 | Poller et al. | |
| 4,510,921 A * | 4/1985 | Yano et al. | 126/619 |
| 4,524,581 A * | 6/1985 | Cascone et al. | 60/781 |
| 4,546,502 A | 10/1985 | Lew | |
| 4,571,949 A | 2/1986 | Moke | |
| 4,581,829 A * | 4/1986 | Becker et al. | 34/402 |
| 4,596,093 A * | 6/1986 | Esposito | 52/86 |
| 4,609,328 A * | 9/1986 | Cirrito | 417/55 |
| 4,609,346 A * | 9/1986 | Siccardi | 432/222 |
| 4,682,985 A | 7/1987 | Kohl | |
| 4,692,172 A | 9/1987 | Stellaccio et al. | |
| 4,725,380 A | 2/1988 | Pinto | |
| 4,728,341 A * | 3/1988 | Nielsen | 48/190 |
| 4,733,528 A | 3/1988 | Pinto | |
| 4,737,103 A * | 4/1988 | Siccardi | 432/222 |
| 4,743,282 A * | 5/1988 | Mehra | 62/625 |
| 4,743,287 A | 5/1988 | Robinson | |
| 4,745,868 A | 5/1988 | Seabury | |
| 4,750,986 A * | 6/1988 | Pinto | 208/64 |
| 4,766,823 A | 8/1988 | Seabury | |
| 4,772,420 A * | 9/1988 | Pinto et al. | 252/377 |
| 4,776,860 A | 10/1988 | Najjar et al. | |
| 4,778,484 A | 10/1988 | Najjar et al. | |
| 4,818,405 A | 4/1989 | Vroom et al. | |
| 4,819,571 A | 4/1989 | Hallett | |
| 4,832,831 A | 5/1989 | Meyer et al. | |
| 4,842,615 A | 6/1989 | Meyer et al. | |
| 4,854,937 A * | 8/1989 | Meyer et al. | 44/280 |
| 4,880,439 A * | 11/1989 | Najjar et al. | 48/197 R |
| 4,881,366 A | 11/1989 | Nurse | |
| 4,898,107 A | 2/1990 | Dickinson | |
| 4,900,429 A | 2/1990 | Richardson | |
| 4,910,228 A | 3/1990 | Lywood | |
| 4,913,799 A | 4/1990 | Gortsema et al. | |
| 4,927,430 A | 5/1990 | Calderon | |
| 4,935,038 A | 6/1990 | Wolf | |
| 4,953,479 A | 9/1990 | Keller et al. | |
| 4,957,049 A | 9/1990 | Strohmeyer, Jr. | |
| 4,957,544 A | 9/1990 | Najjar | |
| 4,971,601 A | 11/1990 | Najjar et al. | |
| 4,974,335 A * | 12/1990 | Bege et al. | 34/424 |
| 4,997,469 A | 3/1991 | Moore | |
| 4,999,992 A | 3/1991 | Nurse | |
| 4,999,995 A | 3/1991 | Nurse | |
| 5,000,099 A | 3/1991 | Dickinson | |
| 5,004,592 A * | 4/1991 | Pinto | 423/652 |
| 5,039,510 A * | 8/1991 | Pinto | 423/652 |
| 5,048,284 A | 9/1991 | Lywood et al. | |
| 5,050,375 A * | 9/1991 | Dickinson | 60/39.12 |
| 5,079,852 A | 1/1992 | Nakayama et al. | |
| 5,082,251 A * | 1/1992 | Whipp | 266/142 |
| 5,083,870 A | 1/1992 | Sindelar et al. | |
| 5,104,419 A * | 4/1992 | Funk | 48/209 |
| 5,113,597 A | 5/1992 | Sylla | |
| 5,117,623 A | 6/1992 | Arundale | |
| 5,132,007 A | 7/1992 | Meyer et al. | |
| 5,134,944 A | 8/1992 | Keller et al. | |
| 5,142,794 A | 9/1992 | Meiners | |
| 5,192,486 A * | 3/1993 | Whipp | 266/156 |
| 5,201,172 A | 4/1993 | Hakulin et al. | |
| 5,211,724 A | 5/1993 | Khan et al. | |
| 5,230,211 A | 7/1993 | McMahon et al. | |
| 5,251,433 A | 10/1993 | Wallace | |
| 5,252,609 A * | 10/1993 | Pinto | 518/703 |
| 5,261,225 A * | 11/1993 | Dickinson | 60/39.55 |
| 5,295,350 A | 3/1994 | Child et al. | |
| 5,312,843 A * | 5/1994 | Yamauchi et al. | 518/702 |
| 5,318,696 A | 6/1994 | Kowalski | |
| 5,319,176 A * | 6/1994 | Alvi et al. | 588/311 |
| 5,319,924 A | 6/1994 | Wallace et al. | |
| 5,343,632 A | 9/1994 | Dinh | |
| 5,345,693 A | 9/1994 | Skjold | |
| 5,345,756 A | 9/1994 | Jahnke et al. | |
| 5,349,810 A | 9/1994 | Landalv | |
| 5,354,349 A | 10/1994 | Inoue | |
| 5,388,395 A | 2/1995 | Scharpf et al. | |
| 5,393,317 A | 2/1995 | Robinson | |
| 5,394,686 A | 3/1995 | Child et al. | |
| 5,401,282 A | 3/1995 | Leininger et al. | |
| 5,403,366 A | 4/1995 | Leininger et al. | |
| 5,428,906 A | 7/1995 | Lynam et al. | |
| 5,451,738 A * | 9/1995 | Alvi et al. | 219/121.59 |
| 5,466,273 A | 11/1995 | Connell | |
| 5,471,937 A | 12/1995 | Kosky et al. | |
| 5,474,686 A | 12/1995 | Barr | |
| 5,479,462 A * | 12/1995 | Yamauchi et al. | 376/325 |
| 5,485,728 A | 1/1996 | Dickinson | |
| 5,527,464 A | 6/1996 | Bartha et al. | |
| 5,535,528 A | 7/1996 | Finkam | |
| 5,541,386 A * | 7/1996 | Alvi et al. | 219/121.38 |
| 5,557,873 A | 9/1996 | Lynam et al. | |
| 5,570,517 A | 11/1996 | Luker | |
| 5,584,171 A | 12/1996 | Sato et al. | |
| 5,588,222 A | 12/1996 | Thompson | |
| 5,592,811 A | 1/1997 | Dodge et al. | |
| 5,596,815 A | 1/1997 | Rice et al. | |
| 5,626,638 A | 5/1997 | Valkanas | |
| 5,636,507 A | 6/1997 | Rajamani et al. | |
| 5,644,928 A * | 7/1997 | Uda et al. | 62/402 |
| 5,650,127 A | 7/1997 | Campbell et al. | |
| 5,653,872 A | 8/1997 | Cohan | |
| 5,676,729 A | 10/1997 | Elrod et al. | |
| 5,685,153 A | 11/1997 | Dickinson et al. | |
| 5,693,296 A | 12/1997 | Holtzapple et al. | |
| 5,695,532 A * | 12/1997 | Johnson et al. | 48/203 |
| 5,724,805 A | 3/1998 | Golomb et al. | |
| 5,727,903 A * | 3/1998 | Borray et al. | 405/128.15 |
| 5,730,922 A | 3/1998 | Babb et al. | |
| 5,740,667 A | 4/1998 | Bhattacharyya et al. | |
| 5,746,006 A | 5/1998 | Duske et al. | |
| 5,756,957 A * | 5/1998 | Titus et al. | 588/311 |
| 5,767,584 A | 6/1998 | Gore et al. | |
| 5,811,752 A * | 9/1998 | Titus et al. | 219/121.37 |
| 5,865,023 A | 2/1999 | Sorensen et al. | |
| 5,865,878 A | 2/1999 | Drnevich et al. | |
| 5,865,898 A | 2/1999 | Holtzapple et al. | |

| Patent | Kind | Date | Inventor | Class |
|---|---|---|---|---|
| 5,866,752 | A | 2/1999 | Goozner | |
| 5,888,389 | A | 3/1999 | Griffith et al. | |
| 5,922,090 | A * | 7/1999 | Fujimura et al. | 48/197 R |
| 5,948,221 | A | 9/1999 | Hsu | |
| 5,983,521 | A | 11/1999 | Thompson | |
| 6,006,440 | A | 12/1999 | Wiesenhofer et al. | |
| 6,018,471 | A * | 1/2000 | Titus et al. | 363/126 |
| 6,029,370 | A | 2/2000 | Cromeens | |
| 6,033,207 | A * | 3/2000 | Cummings | 431/11 |
| 6,037,560 | A * | 3/2000 | Titus et al. | 219/121.37 |
| 6,039,774 | A | 3/2000 | McMullen et al. | |
| 6,093,380 | A * | 7/2000 | Lagana et al. | 423/239.1 |
| 6,114,400 | A | 9/2000 | Nataraj et al. | |
| 6,125,633 | A | 10/2000 | Strohmeyer, Jr. | |
| 6,139,604 | A * | 10/2000 | Gottzmann et al. | 95/54 |
| 6,141,796 | A | 11/2000 | Cummings | |
| 6,149,773 | A * | 11/2000 | Grimshaw et al. | 201/21 |
| 6,155,212 | A | 12/2000 | McAlister | |
| 6,159,263 | A | 12/2000 | Greer et al. | |
| 6,160,238 | A * | 12/2000 | Titus et al. | 219/121.37 |
| 6,171,499 | B1 | 1/2001 | Bouchalat | |
| 6,172,124 | B1 * | 1/2001 | Wolflick et al. | 518/705 |
| 6,173,508 | B1 | 1/2001 | Strohmeyer, Jr. | |
| 6,182,584 | B1 | 2/2001 | Gaudio | |
| 6,189,234 | B1 | 2/2001 | Luker | |
| 6,190,429 | B1 * | 2/2001 | Fujimura et al. | 48/197 R |
| 6,197,081 | B1 | 3/2001 | Schmidt | |
| 6,215,678 | B1 * | 4/2001 | Titus et al. | 363/126 |
| 6,216,463 | B1 * | 4/2001 | Stewart | 60/641.2 |
| 6,218,173 | B1 | 4/2001 | Naito | |
| 6,230,480 | B1 | 5/2001 | Rollins, III | |
| 6,233,844 | B1 | 5/2001 | Gallego Juarez et al. | |
| 6,237,337 | B1 | 5/2001 | Bronicki et al. | |
| 6,243,968 | B1 * | 6/2001 | Conrad et al. | 34/255 |
| 6,250,236 | B1 | 6/2001 | Feizollahi | |
| 6,264,841 | B1 | 7/2001 | Tudor | |
| 6,272,839 | B1 * | 8/2001 | Karl | 60/783 |
| 6,277,894 | B1 | 8/2001 | Agee et al. | |
| 6,293,121 | B1 | 9/2001 | Labrador | |
| 6,293,985 | B1 | 9/2001 | Phinney | |
| 6,306,917 | B1 * | 10/2001 | Bohn et al. | 518/700 |
| 6,321,539 | B1 | 11/2001 | Bronicki et al. | |
| 6,325,837 | B1 | 12/2001 | Lentz | |
| 6,327,994 | B1 | 12/2001 | Labrador | |
| 6,345,495 | B1 * | 2/2002 | Cummings | 60/39.465 |
| 6,346,551 | B1 | 2/2002 | Koyama et al. | |
| 6,350,394 | B1 | 2/2002 | Ennis et al. | |
| 6,355,456 | B1 | 3/2002 | Hallberg et al. | |
| 6,367,163 | B1 | 4/2002 | Luker | |
| 6,381,963 | B1 * | 5/2002 | Graham | 60/645 |
| 6,393,821 | B1 | 5/2002 | Prabhu | |
| 6,398,851 | B1 | 6/2002 | Bose | |
| 6,410,283 | B1 * | 6/2002 | Rehmat et al. | 435/167 |
| 6,419,856 | B1 | 7/2002 | Cirrito et al. | |
| 6,446,385 | B1 | 9/2002 | Crutcher | |
| 6,451,589 | B1 | 9/2002 | Dvorak | |
| 6,461,399 | B1 | 10/2002 | Connell | |
| 6,471,898 | B1 | 10/2002 | Barre et al. | |
| 6,484,417 | B2 | 11/2002 | Tedman et al. | |
| 6,494,045 | B2 | 12/2002 | Rollins, III | |
| 6,497,741 | B2 | 12/2002 | Sower | |
| 6,497,856 | B1 * | 12/2002 | Lomax et al. | 423/651 |
| 6,502,402 | B1 | 1/2003 | Smith et al. | |
| 6,505,467 | B1 | 1/2003 | Fjellhaug et al. | |
| 6,506,311 | B2 | 1/2003 | DeGarmo et al. | |
| 6,510,695 | B1 | 1/2003 | Fisher | |
| 6,517,600 | B1 | 2/2003 | Dinel | |
| 6,519,926 | B2 | 2/2003 | Hazlebeck | |
| 6,521,129 | B1 * | 2/2003 | Stamper et al. | 210/603 |
| 6,524,632 | B2 | 2/2003 | Kartchner | |
| 6,534,105 | B2 | 3/2003 | Kartchner | |
| 6,554,061 | B2 | 4/2003 | Jukkola et al. | |
| 6,578,354 | B2 | 6/2003 | Hatamiya et al. | |
| 6,584,936 | B2 | 7/2003 | Rivard | |
| 6,588,212 | B1 | 7/2003 | Wallace et al. | |
| 6,588,504 | B2 | 7/2003 | Wellington et al. | |
| 6,596,780 | B2 | 7/2003 | Jahnke et al. | |
| 6,606,848 | B1 | 8/2003 | Rollins, III | |
| 6,613,562 | B2 | 9/2003 | Dvorak | |
| 6,615,589 | B2 | 9/2003 | Allam et al. | |
| 6,616,901 | B1 * | 9/2003 | Lagana et al. | 422/148 |
| 6,623,546 | B1 | 9/2003 | Bourdel | |
| 6,623,719 | B2 * | 9/2003 | Lomax et al. | 423/652 |
| 6,629,414 | B2 | 10/2003 | Fischer | |
| 6,630,113 | B1 * | 10/2003 | Surma | 422/199 |
| 6,634,576 | B2 | 10/2003 | Verhoff et al. | |
| 6,638,757 | B1 | 10/2003 | Teran et al. | |
| 6,645,267 | B1 | 11/2003 | Dinel | |
| 6,648,931 | B1 * | 11/2003 | Rao | 48/62 R |
| 6,648,932 | B1 * | 11/2003 | Maton | 48/119 |
| 6,673,845 | B2 | 1/2004 | Price | |
| 6,676,716 | B2 * | 1/2004 | Fujimura et al. | 48/197 FM |
| 6,682,578 | B2 | 1/2004 | Sower | |
| 6,688,018 | B2 * | 2/2004 | Soucy | 34/68 |
| 6,694,738 | B2 | 2/2004 | Bronicki et al. | |
| 6,710,090 | B2 | 3/2004 | Koyama et al. | |
| 6,716,360 | B2 | 4/2004 | Titmas | |
| 6,722,845 | B2 | 4/2004 | Chard et al. | |
| 6,734,331 | B2 * | 5/2004 | Cirrito et al. | 585/652 |
| 6,737,026 | B1 | 5/2004 | Bergh et al. | |
| 6,745,573 | B2 | 6/2004 | Marin et al. | |
| 6,748,743 | B1 | 6/2004 | Foster-Pegg | |
| 6,749,814 | B1 | 6/2004 | Bergh et al. | |
| 6,756,140 | B1 | 6/2004 | McAlister | |
| 6,790,317 | B2 | 9/2004 | Antal, Jr. | |
| 6,790,349 | B1 | 9/2004 | Sawyer | |
| 6,792,759 | B2 | 9/2004 | Rollins, III | |
| 6,793,704 | B2 | 9/2004 | You | |
| 6,804,964 | B2 | 10/2004 | Bellows et al. | |
| 6,808,390 | B1 * | 10/2004 | Fung | 432/14 |
| 6,824,682 | B2 | 11/2004 | Branson | |
| 6,846,343 | B2 | 1/2005 | Sower | |
| 6,854,279 | B1 | 2/2005 | Digiovanni et al. | |
| 6,862,886 | B2 * | 3/2005 | Stewart | 60/641.2 |
| 6,872,752 | B2 | 3/2005 | O'Rear et al. | |
| 6,880,263 | B2 | 4/2005 | Gasparini et al. | |
| 6,890,493 | B1 | 5/2005 | Bergh et al. | |
| 6,895,760 | B2 | 5/2005 | Kesseli | |
| 6,898,540 | B2 | 5/2005 | Davies | |
| 6,902,934 | B1 | 6/2005 | Bergh et al. | |
| 6,908,740 | B2 | 6/2005 | Vandekerckhove et al. | |
| 6,923,004 | B2 | 8/2005 | Chandran et al. | |
| 6,943,001 | B2 | 9/2005 | Zhao et al. | |
| 6,944,967 | B1 | 9/2005 | Staples | |
| 6,948,319 | B2 | 9/2005 | Hayakawa et al. | |
| RE38,815 | E | 10/2005 | Maese et al. | |
| 6,966,374 | B2 * | 11/2005 | Vinegar et al. | 166/272.3 |
| 6,969,123 | B2 * | 11/2005 | Vinegar et al. | 299/3 |
| 6,978,725 | B2 | 12/2005 | Ramharter et al. | |
| 6,979,733 | B2 | 12/2005 | Zhao et al. | |
| 6,981,548 | B2 * | 1/2006 | Wellington et al. | 166/245 |
| 6,981,994 | B2 | 1/2006 | Drnevich et al. | |
| 6,984,305 | B2 | 1/2006 | McAlister | |
| 6,987,792 | B2 * | 1/2006 | Do et al. | 373/18 |
| 6,991,032 | B2 * | 1/2006 | Berchenko et al. | 166/245 |
| 6,991,033 | B2 * | 1/2006 | Wellington et al. | 166/245 |
| 6,991,036 | B2 * | 1/2006 | Sumnu-Dindoruk et al. | 166/302 |
| 6,991,045 | B2 * | 1/2006 | Vinegar et al. | 175/45 |
| 6,994,169 | B2 * | 2/2006 | Zhang et al. | 166/302 |
| 6,997,518 | B2 * | 2/2006 | Vinegar et al. | 299/5 |
| 7,004,247 | B2 * | 2/2006 | Cole et al. | 166/60 |
| 7,004,251 | B2 * | 2/2006 | Ward et al. | 166/245 |
| 7,011,154 | B2 * | 3/2006 | Maher et al. | 166/245 |
| 7,012,038 | B2 * | 3/2006 | Alerasool et al. | 502/300 |
| 7,013,972 | B2 * | 3/2006 | Vinegar et al. | 166/257 |
| 7,017,330 | B2 | 3/2006 | Bellows | |
| 7,024,796 | B2 * | 4/2006 | Carin et al. | 34/363 |
| 7,024,800 | B2 * | 4/2006 | Gorbell et al. | 34/576 |
| 7,028,478 | B2 * | 4/2006 | Prentice, III | 60/645 |
| 7,029,273 | B2 * | 4/2006 | Fung et al. | 432/14 |
| 7,032,660 | B2 * | 4/2006 | Vinegar et al. | 166/245 |
| 7,040,397 | B2 * | 5/2006 | de Rouffignac et al. | 166/245 |
| 7,040,398 | B2 * | 5/2006 | Wellington et al. | 166/245 |
| 7,040,399 | B2 * | 5/2006 | Wellington et al. | 166/245 |
| 7,040,400 | B2 * | 5/2006 | de Rouffignac et al. | 166/245 |
| 7,041,272 | B2 * | 5/2006 | Keefer et al. | 423/651 |
| 7,045,237 | B2 * | 5/2006 | Sridhar et al. | 429/30 |
| 7,051,807 | B2 * | 5/2006 | Vinegar et al. | 166/245 |

| Patent | Date | Inventor | Ref |
|---|---|---|---|
| 7,051,808 B1 * | 5/2006 | Vinegar et al. | 166/250.1 |
| 7,051,811 B2 * | 5/2006 | de Rouffignac et al. | 166/302 |
| 7,055,325 B2 | 6/2006 | Wolken | |
| 7,055,600 B2 * | 6/2006 | Messier et al. | 166/250.01 |
| 7,063,145 B2 * | 6/2006 | Veenstra et al. | 166/250.01 |
| 7,066,254 B2 * | 6/2006 | Vinegar et al. | 166/245 |
| 7,066,257 B2 * | 6/2006 | Wellington et al. | 166/272.2 |
| 7,067,208 B2 * | 6/2006 | Gottmann et al. | 429/13 |
| 7,071,376 B2 | 7/2006 | Chapple et al. | |
| 7,073,578 B2 | 7/2006 | Vinegar et al. | |
| 7,077,198 B2 * | 7/2006 | Vinegar et al. | 166/245 |
| 7,077,199 B2 * | 7/2006 | Vinegar et al. | 166/250.01 |
| 7,078,035 B2 | 7/2006 | Short et al. | |
| 7,078,229 B2 * | 7/2006 | Dvorak | 435/290.1 |
| 7,086,465 B2 * | 8/2006 | Wellington et al. | 166/272.1 |
| 7,086,823 B2 * | 8/2006 | Michaud | 415/4.2 |
| 7,087,331 B2 * | 8/2006 | Keefer et al. | 429/17 |
| 7,087,652 B2 | 8/2006 | Abbott et al. | |
| 7,090,013 B2 * | 8/2006 | Wellington | 166/267 |
| 7,096,942 B1 * | 8/2006 | de Rouffignac et al. | 166/245 |
| 7,097,925 B2 * | 8/2006 | Keefer | 429/9 |
| 7,100,994 B2 * | 9/2006 | Vinegar et al. | 299/7 |
| 7,104,319 B2 * | 9/2006 | Vinegar et al. | 166/245 |
| 7,105,088 B2 | 9/2006 | Schien et al. | |
| 7,114,566 B2 * | 10/2006 | Vinegar et al. | 166/256 |
| 7,121,341 B2 | 10/2006 | Vinegar et al. | |
| 7,121,342 B2 | 10/2006 | Vinegar et al. | |
| 7,128,153 B2 * | 10/2006 | Vinegar et al. | 166/285 |
| 7,131,259 B2 * | 11/2006 | Rollins, III | 60/39.182 |
| 7,134,285 B2 * | 11/2006 | Primlani | 60/784 |
| 7,135,248 B2 * | 11/2006 | Finn et al. | 429/38 |
| 7,144,651 B2 * | 12/2006 | Finn et al. | 429/35 |
| 7,148,261 B2 * | 12/2006 | Hershkowitz et al. | 518/709 |
| 7,150,821 B2 | 12/2006 | O'Rear et al. | |
| 7,156,176 B2 * | 1/2007 | Vinegar et al. | 166/302 |
| 7,162,875 B2 | 1/2007 | Fletcher et al. | |
| 7,165,615 B2 * | 1/2007 | Vinegar et al. | 166/302 |
| 7,166,796 B2 | 1/2007 | Nicoloau | |
| 7,167,240 B2 * | 1/2007 | Stagg | 356/337 |
| 7,169,821 B2 | 1/2007 | Branson | |
| 7,178,262 B2 | 2/2007 | Staples | |
| 7,179,642 B2 * | 2/2007 | Dvorak | 210/612 |
| 7,181,865 B2 * | 2/2007 | Kolega et al. | 34/572 |
| 7,183,328 B2 * | 2/2007 | Hershkowitz et al. | 518/709 |
| 7,189,270 B2 | 3/2007 | Bryan et al. | |
| 7,208,530 B2 | 4/2007 | Norbeck et al. | |
| 7,219,734 B2 | 5/2007 | Bai et al. | |
| 7,225,866 B2 * | 6/2007 | Berchenko et al. | 166/245 |
| 7,232,672 B2 | 6/2007 | Weiner et al. | |
| 7,232,937 B2 | 6/2007 | Bushuev | |
| 7,240,440 B2 * | 7/2007 | Delons | 34/93 |
| 7,255,956 B2 * | 8/2007 | McElroy et al. | 429/41 |
| 7,266,940 B2 | 9/2007 | Balan et al. | |
| 7,272,934 B2 | 9/2007 | Chandran et al. | |
| 7,279,611 B2 * | 10/2007 | Alerasool et al. | 585/663 |
| 7,279,655 B2 * | 10/2007 | Blutke et al. | 219/121.59 |
| 7,282,189 B2 | 10/2007 | Zauderer | |
| 7,285,350 B2 * | 10/2007 | Keefer et al. | 429/34 |
| 7,318,315 B2 * | 1/2008 | Stewart | 60/641.2 |
| 7,329,489 B2 | 2/2008 | Kaddurah-Daouk et al. | |
| 7,334,345 B2 | 2/2008 | Lasonde | |
| 7,340,845 B2 * | 3/2008 | Kneebone | 34/60 |
| 7,354,562 B2 * | 4/2008 | Ying et al. | 423/437.2 |
| 7,360,588 B2 | 4/2008 | Vinegar et al. | |
| 7,374,742 B2 * | 5/2008 | Geosits et al. | 423/573.1 |
| 7,375,142 B2 | 5/2008 | Pearson | |
| 7,381,383 B1 * | 6/2008 | Yokoyama et al. | 422/198 |
| 7,381,550 B2 | 6/2008 | Hallberg et al. | |
| RE40,419 E | 7/2008 | Norbeck et al. | |
| 7,395,670 B1 * | 7/2008 | Drnevich et al. | 60/780 |
| 7,404,891 B2 * | 7/2008 | van Egmond et al. | 208/159 |
| 7,407,121 B2 | 8/2008 | Kerns et al. | |
| 7,422,624 B2 * | 9/2008 | Åsen et al. | 95/54 |
| 7,431,821 B2 | 10/2008 | O'Rear et al. | |
| 7,432,098 B2 | 10/2008 | Short et al. | |
| 7,435,037 B2 * | 10/2008 | McKinzie, II | 405/130 |
| 7,451,591 B2 * | 11/2008 | Wakefield et al. | 60/39.464 |
| 7,452,392 B2 * | 11/2008 | Nick et al. | 48/198.1 |
| 7,461,691 B2 * | 12/2008 | Vinegar et al. | 166/60 |
| 7,487,601 B2 * | 2/2009 | Carin et al. | 34/381 |
| 7,491,444 B2 | 2/2009 | Smith et al. | |
| 7,500,528 B2 * | 3/2009 | McKinzie et al. | 175/17 |
| 7,500,997 B2 | 3/2009 | Norbeck et al. | |
| 7,504,120 B2 | 3/2009 | Steer et al. | |
| 7,524,528 B2 | 4/2009 | Kodas et al. | |
| 7,527,094 B2 * | 5/2009 | McKinzie et al. | 166/250.07 |
| 7,537,803 B2 | 5/2009 | Wang et al. | |
| 7,540,888 B2 | 6/2009 | Ryder et al. | |
| 7,546,873 B2 * | 6/2009 | Kim et al. | 166/245 |
| 7,547,390 B2 | 6/2009 | McCorkle | |
| 7,547,534 B2 | 6/2009 | Steer et al. | |
| 7,549,470 B2 * | 6/2009 | Vinegar et al. | 166/245 |
| 7,550,258 B2 | 6/2009 | Kaddurah-Daouk et al. | |
| 7,550,260 B2 | 6/2009 | Kaddurah-Daouk et al. | |
| 7,553,463 B2 * | 6/2009 | Zauderer | 423/210 |
| 7,553,568 B2 * | 6/2009 | Keefer | 429/13 |
| 7,553,616 B2 | 6/2009 | Kaddurah-Daouk et al. | |
| 7,556,095 B2 * | 7/2009 | Vinegar | 166/250.01 |
| 7,556,096 B2 * | 7/2009 | Vinegar et al. | 166/250.01 |
| 7,559,367 B2 * | 7/2009 | Vinegar et al. | 166/272.3 |
| 7,559,368 B2 * | 7/2009 | Vinegar et al. | 166/272.6 |
| 7,560,126 B2 | 7/2009 | Callen et al. | |
| 7,562,706 B2 * | 7/2009 | Li et al. | 166/245 |
| 7,575,052 B2 * | 8/2009 | Sandberg et al. | 166/248 |
| 7,575,053 B2 * | 8/2009 | Vinegar et al. | 166/250.14 |
| 7,581,589 B2 * | 9/2009 | Roes et al. | 166/267 |
| 7,584,789 B2 * | 9/2009 | Mo et al. | 166/267 |
| 7,589,243 B1 | 9/2009 | Ryder | |
| 7,591,310 B2 * | 9/2009 | Minderhoud et al. | 166/267 |
| 7,592,434 B2 | 9/2009 | Kerovuo et al. | |
| 7,596,939 B2 * | 10/2009 | Kataoka et al. | 60/39.281 |
| 7,600,396 B2 | 10/2009 | Mak | |
| 7,610,692 B2 | 11/2009 | Carin et al. | |
| 7,617,617 B2 | 11/2009 | Gorbell et al. | |
| 7,622,693 B2 | 11/2009 | Foret | |
| 7,735,935 B2 * | 6/2010 | Vinegar et al. | 299/5 |
| 7,798,220 B2 * | 9/2010 | Vinegar et al. | 166/272.3 |
| 7,831,133 B2 * | 11/2010 | Vinegar et al. | 392/301 |
| 7,831,134 B2 * | 11/2010 | Vinegar et al. | 392/301 |
| 7,832,484 B2 * | 11/2010 | Nguyen et al. | 166/302 |
| 7,841,408 B2 * | 11/2010 | Vinegar | 166/272.3 |
| 7,841,425 B2 * | 11/2010 | Mansure et al. | 175/57 |
| 7,849,922 B2 * | 12/2010 | Vinegar et al. | 166/272.1 |
| 7,860,377 B2 * | 12/2010 | Vinegar et al. | 392/301 |
| 7,866,386 B2 * | 1/2011 | Beer et al. | 166/258 |
| 7,866,388 B2 * | 1/2011 | Bravo | 166/267 |
| 2001/0023576 A1 | 9/2001 | Rollins, III | |
| 2001/0047040 A1 | 11/2001 | Agee et al. | |
| 2002/0046561 A1 | 4/2002 | Bronicki et al. | |
| 2002/0047058 A1 | 4/2002 | Verhoff et al. | |
| 2002/0062496 A1 | 5/2002 | Chapple et al. | |
| 2002/0098394 A1 | 7/2002 | Keefer et al. | |
| 2002/0114866 A1 | 8/2002 | Kartchner | |
| 2002/0115731 A1 | 8/2002 | Price | |
| 2002/0120017 A1 | 8/2002 | Bohn et al. | |
| 2002/0121092 A1 | 9/2002 | Allam et al. | |
| 2002/0122850 A1 | 9/2002 | Kartchner | |
| 2002/0124431 A1 * | 9/2002 | Duhaut et al. | 34/417 |
| 2002/0124996 A1 | 9/2002 | Jukkola et al. | |
| 2002/0162332 A1 | 11/2002 | Hazlebeck | |
| 2002/0165206 A1 | 11/2002 | Koyama et al. | |
| 2002/0166323 A1 | 11/2002 | Marin et al. | |
| 2002/0179493 A1 | 12/2002 | Etter | |
| 2003/0012997 A1 | 1/2003 | Hsu | |
| 2003/0024165 A1 | 2/2003 | Antal, Jr. | |
| 2003/0024806 A1 | 2/2003 | Foret | |
| 2003/0038078 A1 | 2/2003 | Stamper et al. | |
| 2003/0062270 A1 | 4/2003 | McAlister | |
| 2003/0079363 A1 * | 5/2003 | Soucy | 34/60 |
| 2003/0079877 A1 * | 5/2003 | Wellington et al. | 166/272.1 |
| 2003/0080604 A1 * | 5/2003 | Vinegar et al. | 299/14 |
| 2003/0083391 A1 | 5/2003 | Jahnke et al. | |
| 2003/0089151 A1 | 5/2003 | Logan et al. | |
| 2003/0098149 A1 * | 5/2003 | Wellington et al. | 166/52 |
| 2003/0098227 A1 | 5/2003 | Okamoto et al. | |
| 2003/0098605 A1 * | 5/2003 | Vinegar et al. | 299/14 |
| 2003/0100451 A1 * | 5/2003 | Messier et al. | 507/100 |
| 2003/0102124 A1 * | 6/2003 | Vinegar et al. | 166/256 |

| | | | |
|---|---|---|---|
| 2003/0102125 A1* | 6/2003 | Wellington et al. ............ 166/266 |
| 2003/0102126 A1* | 6/2003 | Sumnu-Dindoruk et al. ............................ 166/272.1 |
| 2003/0102130 A1* | 6/2003 | Vinegar et al. ................. 166/302 |
| 2003/0103958 A1 | 6/2003 | Short et al. |
| 2003/0110693 A1 | 6/2003 | Drnevich et al. |
| 2003/0110892 A1 | 6/2003 | Nicolaou |
| 2003/0111223 A1* | 6/2003 | Rouffignac et al. ............ 166/256 |
| 2003/0111410 A1 | 6/2003 | Branson |
| 2003/0116315 A1* | 6/2003 | Wellington et al. ............ 166/256 |
| 2003/0130136 A1* | 7/2003 | Rouffignac et al. ............ 507/200 |
| 2003/0131993 A1* | 7/2003 | Zhang et al. .................... 166/256 |
| 2003/0131994 A1* | 7/2003 | Vinegar et al. ................. 166/256 |
| 2003/0131995 A1* | 7/2003 | de Rouffignac et al. ... 166/272.1 |
| 2003/0131996 A1* | 7/2003 | Vinegar et al. .............. 166/272.1 |
| 2003/0136165 A1 | 7/2003 | Logan et al. |
| 2003/0136558 A1* | 7/2003 | Wellington et al. ............ 166/245 |
| 2003/0136559 A1* | 7/2003 | Wellington et al. ....... 166/250.01 |
| 2003/0137181 A1* | 7/2003 | Wellington et al. .................. 299/5 |
| 2003/0141066 A1* | 7/2003 | Karanikas et al. ............. 166/302 |
| 2003/0141067 A1* | 7/2003 | Rouffignac et al. ............ 166/302 |
| 2003/0141068 A1* | 7/2003 | Pierre de Rouffignac et al. ............................ 166/302 |
| 2003/0142964 A1* | 7/2003 | Wellington et al. ............ 392/301 |
| 2003/0146002 A1* | 8/2003 | Vinegar et al. ................. 166/384 |
| 2003/0148443 A1 | 8/2003 | Zhao et al. |
| 2003/0148490 A1 | 8/2003 | Zhao et al. |
| 2003/0148894 A1* | 8/2003 | Vinegar et al. ................. 507/200 |
| 2003/0150215 A1 | 8/2003 | Rollins, III |
| 2003/0155111 A1* | 8/2003 | Vinegar et al. ................... 166/59 |
| 2003/0162846 A1 | 8/2003 | Wang et al. |
| 2003/0164239 A1* | 9/2003 | Wellington et al. ............ 166/302 |
| 2003/0173072 A1* | 9/2003 | Vinegar et al. ................. 166/66.5 |
| 2003/0173078 A1* | 9/2003 | Wellington et al. ....... 166/250.07 |
| 2003/0173080 A1* | 9/2003 | Berchenko et al. ............ 166/256 |
| 2003/0173081 A1* | 9/2003 | Vinegar et al. .............. 166/272.1 |
| 2003/0173082 A1* | 9/2003 | Vinegar et al. .............. 166/272.2 |
| 2003/0173085 A1* | 9/2003 | Vinegar et al. ................. 166/302 |
| 2003/0175411 A1 | 9/2003 | Kodas et al. |
| 2003/0178191 A1* | 9/2003 | Maher et al. ................... 166/65.1 |
| 2003/0180742 A1 | 9/2003 | Weiner et al. |
| 2003/0183390 A1* | 10/2003 | Veenstra et al. ............... 166/302 |
| 2003/0192691 A1* | 10/2003 | Vinegar et al. ............ 166/250.12 |
| 2003/0192693 A1* | 10/2003 | Wellington .................... 166/267 |
| 2003/0196788 A1* | 10/2003 | Vinegar et al. ................... 166/57 |
| 2003/0196789 A1* | 10/2003 | Wellington et al. .............. 166/64 |
| 2003/0196801 A1* | 10/2003 | Vinegar et al. ................. 166/263 |
| 2003/0196810 A1* | 10/2003 | Vinegar et al. ................. 166/300 |
| 2003/0201098 A1* | 10/2003 | Karanikas et al. ............... 166/53 |
| 2003/0205378 A1* | 11/2003 | Wellington et al. ............ 166/302 |
| 2003/0209348 A1* | 11/2003 | Ward et al. ..................... 166/256 |
| 2004/0005633 A1 | 1/2004 | Vandekerckhove et al. |
| 2004/0011057 A1 | 1/2004 | Huber |
| 2004/0018607 A1 | 1/2004 | Callen et al. |
| 2004/0020642 A1* | 2/2004 | Vinegar et al. ................. 166/245 |
| 2004/0025715 A1 | 2/2004 | Bonde et al. |
| 2004/0031256 A1 | 2/2004 | Rollins, III |
| 2004/0040174 A1 | 3/2004 | Childs |
| 2004/0040715 A1* | 3/2004 | Wellington et al. ............ 166/302 |
| 2004/0045682 A1 | 3/2004 | Liprie |
| 2004/0050069 A1 | 3/2004 | Willems et al. |
| 2004/0055517 A1 | 3/2004 | Nunemacher |
| 2004/0055716 A1 | 3/2004 | Landalv et al. |
| 2004/0060277 A1 | 4/2004 | Hatamiya et al. |
| 2004/0079087 A1 | 4/2004 | Chandran et al. |
| 2004/0081614 A1 | 4/2004 | Ying et al. |
| 2004/0087011 A1 | 5/2004 | Dvorak |
| 2004/0103068 A1 | 5/2004 | Eker et al. |
| 2004/0131912 A1 | 7/2004 | Keefer et al. |
| 2004/0140095 A1 | 7/2004 | Vinegar et al. |
| 2004/0140096 A1 | 7/2004 | Sandberg et al. |
| 2004/0144540 A1 | 7/2004 | Sandberg et al. |
| 2004/0144541 A1 | 7/2004 | Picha et al. |
| 2004/0145969 A1 | 7/2004 | Bai et al. |
| 2004/0146288 A1 | 7/2004 | Vinegar et al. |
| 2004/0149626 A1 | 8/2004 | O'Rear et al. |
| 2004/0152793 A1 | 8/2004 | O'Rear et al. |
| 2004/0152933 A1 | 8/2004 | O'Rear et al. |
| 2004/0154184 A1 | 8/2004 | Bloemendaal |
| 2004/0170210 A1 | 9/2004 | Do et al. |
| 2004/0177966 A1 | 9/2004 | Vinegar et al. |
| 2004/0178052 A1 | 9/2004 | Antal, Jr. |
| 2004/0182000 A1 | 9/2004 | Mansour et al. |
| 2004/0194337 A1 | 10/2004 | Gasparini et al. |
| 2004/0211554 A1* | 10/2004 | Vinegar et al. ................... 166/60 |
| 2004/0211557 A1* | 10/2004 | Cole et al. ................... 166/242.1 |
| 2004/0211569 A1 | 10/2004 | Vinegar et al. |
| 2004/0224926 A1 | 11/2004 | Koyama et al. |
| 2004/0238596 A1 | 12/2004 | Ellison et al. |
| 2004/0261285 A1 | 12/2004 | Harada |
| 2005/0006097 A1 | 1/2005 | Sandberg et al. |
| 2005/0009175 A1 | 1/2005 | Bergh et al. |
| 2005/0032920 A1 | 2/2005 | Norbeck et al. |
| 2005/0051327 A1 | 3/2005 | Vinegar et al. |
| 2005/0072343 A1 | 4/2005 | Fung et al. |
| 2005/0084980 A1 | 4/2005 | Koo et al. |
| 2005/0092483 A1* | 5/2005 | Vinegar et al. ................... 166/60 |
| 2005/0110990 A1 | 5/2005 | Koo et al. |
| 2005/0113467 A1 | 5/2005 | Branson |
| 2005/0120715 A1 | 6/2005 | Labrador |
| 2005/0124010 A1 | 6/2005 | Short et al. |
| 2005/0135983 A1 | 6/2005 | Geosits et al. |
| 2005/0144961 A1 | 7/2005 | Colibaba-Evulet et al. |
| 2005/0150230 A1 | 7/2005 | Rollins, III |
| 2005/0153410 A1 | 7/2005 | Hallberg et al. |
| 2005/0176000 A1 | 8/2005 | Callen et al. |
| 2005/0191491 A1 | 9/2005 | Wang et al. |
| 2005/0196823 A1 | 9/2005 | Vandekerckhove et al. |
| 2005/0217134 A1 | 10/2005 | Lasonde |
| 2005/0238548 A1 | 10/2005 | van Egmond et al. |
| 2005/0239054 A1 | 10/2005 | Arimilli et al. |
| 2005/0241174 A1* | 11/2005 | Kolega et al. ...................... 34/93 |
| 2005/0246780 A1 | 11/2005 | Short et al. |
| 2005/0246919 A1* | 11/2005 | Delons ............................... 34/93 |
| 2005/0256212 A1 | 11/2005 | Norbeck et al. |
| 2006/0003433 A1 | 1/2006 | Steer et al. |
| 2006/0010708 A1 | 1/2006 | Carin et al. |
| 2006/0010712 A1* | 1/2006 | Carin et al. ...................... 34/443 |
| 2006/0010714 A1* | 1/2006 | Carin et al. ...................... 34/514 |
| 2006/0024328 A1 | 2/2006 | Pasco et al. |
| 2006/0032788 A1 | 2/2006 | Etter |
| 2006/0053791 A1* | 3/2006 | Prentice ........................... 60/645 |
| 2006/0096163 A1 | 5/2006 | Dickinson et al. |
| 2006/0096298 A1 | 5/2006 | Barnicki et al. |
| 2006/0101665 A1* | 5/2006 | Carin et al. ...................... 34/513 |
| 2006/0101881 A1* | 5/2006 | Carin et al. ........................ 71/21 |
| 2006/0112639 A1 | 6/2006 | Nick et al. |
| 2006/0123657 A1 | 6/2006 | Tada et al. |
| 2006/0128818 A1 | 6/2006 | Wang et al. |
| 2006/0130546 A1 | 6/2006 | Beaton et al. |
| 2006/0154126 A1 | 7/2006 | Ritts et al. |
| 2006/0186234 A1 | 8/2006 | Kerns et al. |
| 2006/0201024 A1* | 9/2006 | Carin et al. ...................... 34/576 |
| 2006/0210971 A1 | 9/2006 | Kerovuo et al. |
| 2006/0211777 A1 | 9/2006 | Severinsky |
| 2006/0218905 A1 | 10/2006 | Alexander |
| 2006/0223154 A1 | 10/2006 | Kohr |
| 2006/0240369 A1 | 10/2006 | Duesel, Jr. et al. |
| 2006/0254079 A1* | 11/2006 | Gorbell et al. ................... 34/363 |
| 2006/0254080 A1* | 11/2006 | Carin et al. ...................... 34/363 |
| 2006/0254081 A1* | 11/2006 | Carin et al. ...................... 34/576 |
| 2006/0260190 A1 | 11/2006 | Miyoshi et al. |
| 2006/0265954 A1 | 11/2006 | Dogru et al. |
| 2006/0294620 A1 | 12/2006 | Gray et al. |
| 2007/0006592 A1 | 1/2007 | Balan et al. |
| 2007/0007198 A1 | 1/2007 | Balvanz |
| 2007/0012045 A1 | 1/2007 | Chandran et al. |
| 2007/0039324 A1 | 2/2007 | Inui et al. |
| 2007/0045265 A1 | 3/2007 | McKinzie, II |
| 2007/0045266 A1 | 3/2007 | Sandberg et al. |
| 2007/0045267 A1 | 3/2007 | Vinegar et al. |
| 2007/0045268 A1 | 3/2007 | Vinegar et al. |
| 2007/0056053 A1 | 3/2007 | Gray et al. |
| 2007/0062105 A1* | 3/2007 | Stevens ............................. 47/17 |
| 2007/0066654 A1 | 3/2007 | Koyama et al. |
| 2007/0084077 A1 | 4/2007 | Gorbell et al. |
| 2007/0095046 A1 | 5/2007 | Wallace |
| 2007/0095536 A1 | 5/2007 | Vinegar et al. |

| Publication No. | Date | Name |
|---|---|---|
| 2007/0095537 A1 | 5/2007 | Vinegar |
| 2007/0101732 A1 | 5/2007 | Mak |
| 2007/0105112 A1 | 5/2007 | Hitchman et al. |
| 2007/0108068 A1 | 5/2007 | Suh et al. |
| 2007/0108200 A1 | 5/2007 | McKinzie, II et al. |
| 2007/0108201 A1 | 5/2007 | Vinegar et al. |
| 2007/0114173 A1 | 5/2007 | Dvorak |
| 2007/0119098 A1 | 5/2007 | Diaz et al. |
| 2007/0125533 A1 | 6/2007 | Minderhoud et al. |
| 2007/0127897 A1 | 6/2007 | John et al. |
| 2007/0131411 A1 | 6/2007 | Vinegar et al. |
| 2007/0131415 A1 | 6/2007 | Vinegar et al. |
| 2007/0131419 A1 | 6/2007 | Maria Roes et al. |
| 2007/0131420 A1 | 6/2007 | Mo et al. |
| 2007/0131427 A1 | 6/2007 | Li et al. |
| 2007/0131428 A1 | 6/2007 | Willem Cornelis den Boestert et al. |
| 2007/0133959 A1 | 6/2007 | Vinegar et al. |
| 2007/0133960 A1 | 6/2007 | Vinegar et al. |
| 2007/0133961 A1 | 6/2007 | Fairbanks et al. |
| 2007/0137856 A1 | 6/2007 | McKinzie et al. |
| 2007/0137857 A1 | 6/2007 | Vinegar et al. |
| 2007/0144732 A1 | 6/2007 | Kim et al. |
| 2007/0157329 A1 | 7/2007 | Callen et al. |
| 2007/0163142 A1* | 7/2007 | Carin et al. ............... 34/282 |
| 2007/0163316 A1 | 7/2007 | Fedkenheuer et al. |
| 2007/0166541 A1 | 7/2007 | Smith et al. |
| 2007/0170071 A1 | 7/2007 | Suh et al. |
| 2007/0175063 A1* | 8/2007 | Morgan et al. ............... 34/467 |
| 2007/0202318 A1 | 8/2007 | Smith et al. |
| 2007/0202566 A1 | 8/2007 | Bornscheuer et al. |
| 2007/0204623 A1 | 9/2007 | Rollins, III |
| 2007/0207186 A1 | 9/2007 | Scanlon et al. |
| 2007/0220873 A1 | 9/2007 | Bosteels |
| 2007/0221377 A1 | 9/2007 | Vinegar et al. |
| 2007/0227069 A1 | 10/2007 | Norbeck et al. |
| 2007/0227351 A1 | 10/2007 | Garcia-Martinez |
| 2007/0231820 A1 | 10/2007 | Weiner et al. |
| 2007/0253874 A1 | 11/2007 | Foret |
| 2007/0258869 A1 | 11/2007 | Tsangaris et al. |
| 2007/0266634 A1 | 11/2007 | Tsangaris et al. |
| 2007/0284453 A1 | 12/2007 | Tsangaris et al. |
| 2007/0289216 A1 | 12/2007 | Tsangaris et al. |
| 2007/0293693 A1 | 12/2007 | Krusic et al. |
| 2008/0000100 A1 | 1/2008 | Staples |
| 2008/0017370 A1 | 1/2008 | Vinegar et al. |
| 2008/0020435 A1 | 1/2008 | Burke et al. |
| 2008/0028634 A1 | 2/2008 | Leahy |
| 2008/0050800 A1 | 2/2008 | McKeeman et al. |
| 2008/0052789 A1 | 2/2008 | Jorgensen et al. |
| 2008/0090113 A1 | 4/2008 | Keefer et al. |
| 2008/0104858 A1* | 5/2008 | Carin et al. ............... 34/282 |
| 2008/0104887 A1 | 5/2008 | Tsangaris et al. |
| 2008/0105019 A1* | 5/2008 | Carin et al. ............... 71/15 |
| 2008/0107577 A1 | 5/2008 | Vinegar et al. |
| 2008/0110043 A1* | 5/2008 | Carin et al. ............... 34/487 |
| 2008/0134540 A1 | 6/2008 | Lasonde |
| 2008/0135245 A1 | 6/2008 | Smith et al. |
| 2008/0141643 A1 | 6/2008 | Varatharajan et al. |
| 2008/0147241 A1 | 6/2008 | Tsangaris et al. |
| 2008/0152782 A1 | 6/2008 | Avgoustopoulos et al. |
| 2008/0153145 A1 | 6/2008 | Harper |
| 2008/0155984 A1 | 7/2008 | Liu et al. |
| 2008/0155985 A1 | 7/2008 | Labrador |
| 2008/0161428 A1 | 7/2008 | Strait |
| 2008/0164443 A1 | 7/2008 | White et al. |
| 2008/0167436 A1 | 7/2008 | Schilling et al. |
| 2008/0172899 A1* | 7/2008 | Carin et al. ............... 34/90 |
| 2008/0189979 A1* | 8/2008 | Carin et al. ............... 34/576 |
| 2008/0200558 A1 | 8/2008 | Koyama et al. |
| 2008/0202028 A1 | 8/2008 | Tsangaris et al. |
| 2008/0209807 A1 | 9/2008 | Tsangaris et al. |
| 2008/0217321 A1 | 9/2008 | Vinegar et al. |
| 2008/0221772 A1 | 9/2008 | Carin et al. |
| 2008/0222956 A1 | 9/2008 | Tsangaris et al. |
| 2008/0233175 A1 | 9/2008 | Steer et al. |
| 2008/0245906 A1 | 10/2008 | Kerns et al. |
| 2008/0248160 A1 | 10/2008 | Steer et al. |
| 2008/0261321 A1 | 10/2008 | Patton et al. |
| 2008/0289788 A1 | 11/2008 | Pinkham, Jr. et al. |
| 2008/0305531 A1 | 12/2008 | Lam et al. |
| 2008/0309087 A1 | 12/2008 | Evulet et al. |
| 2009/0000184 A1 | 1/2009 | Garwood |
| 2009/0007484 A1 | 1/2009 | Smith |
| 2009/0013596 A1* | 1/2009 | Wang ............... 47/17 |
| 2009/0020089 A1 | 1/2009 | Ryder et al. |
| 2009/0020090 A1 | 1/2009 | Ryder et al. |
| 2009/0020456 A1 | 1/2009 | Tsangaris et al. |
| 2009/0028767 A1 | 1/2009 | Parker et al. |
| 2009/0038023 A1 | 2/2009 | Weiner et al. |
| 2009/0038797 A1 | 2/2009 | Skala et al. |
| 2009/0062139 A1 | 3/2009 | Short et al. |
| 2009/0070899 A1 | 3/2009 | Apuya et al. |
| 2009/0071647 A1 | 3/2009 | Vinegar et al. |
| 2009/0119990 A1 | 5/2009 | Johnson et al. |
| 2009/0119991 A1 | 5/2009 | Johnson et al. |
| 2009/0119992 A1 | 5/2009 | Johnson et al. |
| 2009/0119994 A1 | 5/2009 | Johnson et al. |
| 2009/0126270 A1 | 5/2009 | Johnson et al. |
| 2009/0126276 A1 | 5/2009 | Johnson et al. |
| 2009/0130128 A1 | 5/2009 | Alberte et al. |
| 2009/0137433 A1 | 5/2009 | Smith et al. |
| 2009/0139134 A1 | 6/2009 | Yoshikuni et al. |
| 2009/0149530 A1 | 6/2009 | Alberte et al. |
| 2009/0152208 A1 | 6/2009 | Agrawal |
| 2009/0152209 A1 | 6/2009 | Agrawal |
| 2009/0155238 A1 | 6/2009 | Weiner et al. |
| 2009/0155873 A1 | 6/2009 | Kashiyama et al. |
| 2009/0163753 A1 | 6/2009 | Roth et al. |
| 2009/0183430 A1 | 7/2009 | Schubert et al. |
| 2009/0188127 A1 | 7/2009 | Gorbell et al. |
| 2009/0188165 A1 | 7/2009 | Ariyapadi et al. |
| 2009/0188290 A1 | 7/2009 | Marler |
| 2009/1083424 | 7/2009 | Gorbell et al. |
| 2009/0200176 A1 | 8/2009 | McCutchen et al. |
| 2009/0217584 A1 | 9/2009 | Raman et al. |
| 2009/0217585 A1 | 9/2009 | Raman et al. |
| 2009/0217588 A1 | 9/2009 | Hippo et al. |
| 2009/0220480 A1 | 9/2009 | Gray et al. |
| 2009/0221051 A1 | 9/2009 | Steer et al. |
| 2009/0221721 A1 | 9/2009 | Norbeck et al. |
| 2009/0227003 A1 | 9/2009 | Blotsky et al. |
| 2009/0255144 A1 | 10/2009 | Gorbell et al. |
| 2009/0261017 A1 | 10/2009 | Iqbal et al. |
| 2009/0305355 A1 | 12/2009 | Henriksen et al. |
| 2009/0320492 A1 | 12/2009 | Carin et al. |

FOREIGN PATENT DOCUMENTS

| | | |
|---|---|---|
| DE | 4331932 | 3/1994 |
| DE | 4331932 A1 * | 3/1994 |
| EP | 278609 A2 * | 8/1988 |
| EP | 0 428 015 B1 | 5/1991 |
| EP | 0 298 941 B1 | 3/1992 |
| EP | 0 677 237 | 3/1997 |
| EP | 1079189 A1 * | 2/2001 |
| EP | 1211401 A1 * | 6/2002 |
| GB | 2237372 A * | 5/1991 |
| GB | 2242261 A * | 9/1991 |
| GB | 2 335 188 A | 9/1999 |
| JP | 55127197 A * | 10/1980 |
| JP | 03114557 A * | 5/1991 |
| JP | 06159934 A * | 6/1994 |
| JP | 09119729 A * | 5/1997 |
| JP | 09209713 A * | 8/1997 |
| JP | 09209714 A * | 8/1997 |
| JP | 10169965 A * | 6/1998 |
| JP | 2001-340828 | 12/2001 |
| WO | WO 95/29884 | 11/1995 |
| WO | WO 9801658 A1 * | 1/1998 |
| WO | WO 01/40644 | 6/2001 |
| WO | WO 02/42611 | 5/2002 |

OTHER PUBLICATIONS

Material Safety Data Sheet Milorganite® 5-2-0 Organic Nitrogen Fertilizer, pp. 1-4 (Sep. 13, 2007).
Material Safety Data Sheet Milorganite® 6-2-0 Fertilizer, pp. 1-4 (Oct. 30, 2001).

Material Safety Data Sheet Milorganite® 6-2-0 Fertilizer, pp. 1-4 (May 29, 2007).

Material Safety Data Sheet Milorganite® GardenCare 6-2-0 Fertilizer, pp. 1-4 (May 29, 2007).

Milwaukee home of Milorganite, http://www.retrocom.com/retromilw/milorg.htm, 3 pages (Date Printed Mar. 17, 2008).

Milorganite Our History, http://www.milorganite.com/about/history.cfm, 2 pages (Copyright 2008).

Milorganite—Wikipedia, the free encyclopedia, http://en.wikipedia.org/wiki/Milorganite, 1 page (Mar. 1, 2008).

Partanen, William E., P.E., Amani VOC/HAP's Mitigation System an Innovative Method of Destroying VOC/HAP's That Provides an Attractive Return on Investment, pp. 1-12, Neill and Gunter (Jan. 2004).

Scott A.S.T. Drying System, Scott Equipment Company, 6 pages (Publicly known at least as early as Feb. 13, 1995).

Fairfield, D, "Pelleting Cost Center," In: R. R. McEllhiney (Ed.) Feed Manufacturing Technology IV, pp. 111-130, Am. Feed Ind. Assoc., Inc., Arlington, VA (1994).

Partanen, William, E., P.E., "VOC Destruction Using Combustion Turbines," pp. 1-9, Neill and Gunter (Sep. 2002).

Miscellaneous pages from Duske Engineering.com, http://www.duskeengineering.com, 11 pp.

"From Feather to Feed Gas-Fired Flashdryers Create Profitable By-Products from Once-Costly Wastes", Industrial Processing, Natual Gus Applications in Business & Industry, pp. A2-A4.

Transcript of audio track of DVD: "Legal Alfalfa Presents—Alfalfa the Remarkable Product", from Legal Alfalfa Products Ltd., Legal, Alberta, Canada (circ. 2004), www.alfatec.ca.

Combined Heat and Power Quality Assurance Programme: Guidance Note 11 (2003); Guidance Note 12 (2003); Guidance Note 16 (2004); Appendix 3 (2000), www.chpqa.com.

Ernest et al., "Waste Heat Utilization for Dewatering Sewage Sludge," *Waste Heat Management and Utilization*, vol. 3, Edited by Lee et al., pp. 2443-2463, 1979.

Perdue AgriRecycle, LLC, Process, www.perdueacrirecycle.com/process.html, 2006/2001.

* cited by examiner

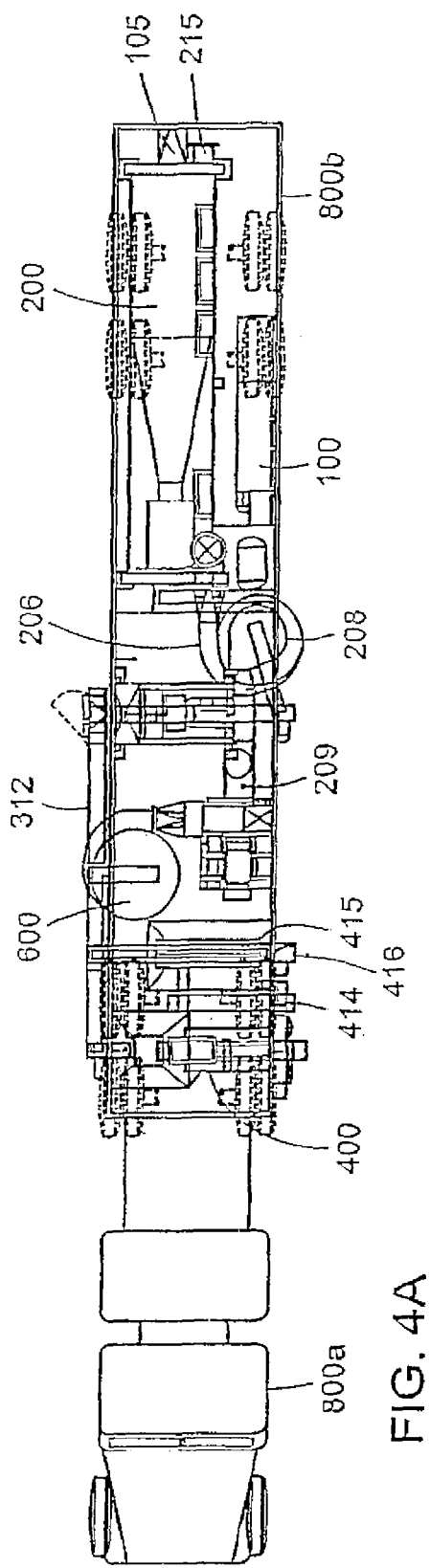
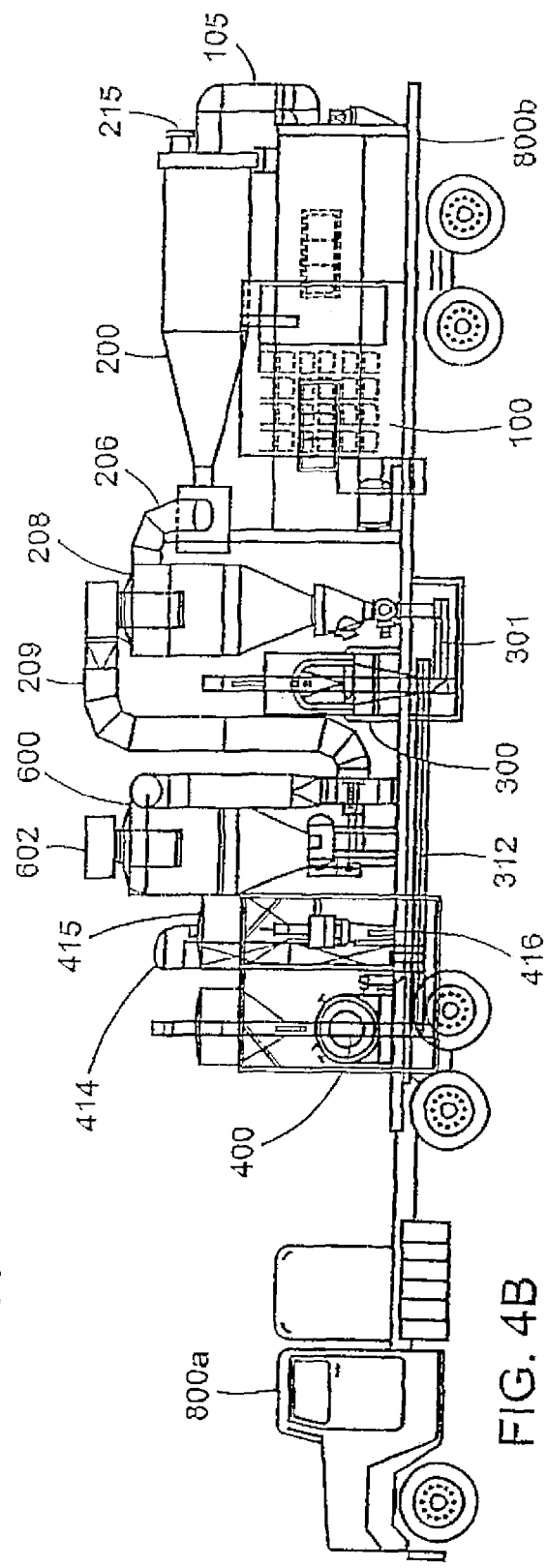
FIG. 4A
FIG. 4B

PROCESS AND SYSTEM FOR DRYING AND HEAT TREATING MATERIALS

PRIORITY CLAIM

This application is a divisional of U.S. patent application Ser. No. 11/184,738, filed Jul. 18, 2005 now U.S. Pat. No. 7,685,737, entitled Process and System for Drying and Heat Treating Materials which claims priority to U.S. Provisional Patent Application No. 60/589,360, filed Jul. 19, 2004, entitled Process and System for Drying and Heat Treating Materials and are incorporated in their entirety by reference thereto.

FIELD OF THE INVENTION

This invention relates to processes, systems and equipment for economically converting waste, intermediate or raw materials, either organic or inorganic in nature, into products useful as animal or human food, fuel products, recyclable materials for further or new processing, fertilizer or soil builder products, materials for disposal at reduced volumes and final products for market.

BACKGROUND OF THE INVENTION

Industrial processing facilities for food, paper, drug and other manufacturing, processing and packaging are becoming larger and more concentrated. Consequently, the waste streams produced by these facilities are becoming increasingly larger, more concentrated locally and more difficult and costly to dispose of due to government regulations as well as decreasing numbers and sizes of landfill sites that are available for waste disposal. More people are consuming commercially prepared and processed food both in and out of the home than ever before. This is true not only in the United States, but in other countries as well. This phenomenon creates an enormous amount of waste, i.e., food scraps, over-ripe food, trimmings, spoilage and animal parts discarded during food preparation, that is concentrated in large processing facilities and that must be disposed of in municipal sewage, landfills or incinerators. The waste is produced in larger and larger amounts in facilities that produce pre-prepared food products, such as frozen foods, pre-prepared, ready-to-eat salad mixes, heat-and-serve meals, and the like for home, institutional, airline, hotel and other uses. This waste is frequently difficult and costly to dispose of, primarily because it commonly has high water content and has little economic value as a fuel. The art is replete with various complex processes and systems that address the problems of such waste disposal and/or conversion to useful, recyclable or disposable products. However, most prior processes and systems are not practical or desirable due to economic considerations, due to the limited type of waste that can be treated or processed in a particular system, due to environmental problems caused by operation of the processes or system or due to other disadvantages. Moreover, the eruption of transmittable spongiform encephalopathy (TSE), particularly bovine spongiform encephalopathy (BSE) and scrapie diseases, has made inactivation of pathogenic agents essential, whether the waste material is processed for recycle or for disposal. Animal wastes, such as offal, paunch waste material and carcasses, are subject to carrying infectious agents including fungi, bacteria, viruses and prions associated with BSE, TSE, etc. The prior art processes available are either not satisfactorily effective from a technical standpoint or are not economically desirable. A need therefore exists for methods of processing and/or disposal of food processing, slaughter house, and similar wastes without the technical or economic disadvantages of the prior art.

Examples of the prior art publications that have addressed the above problems by digestion, incineration, volume reduction and/or decomposition include U.S. Pat. No. 5,685,153 to Dickinson et al.; U.S. Pat. No. 6,197,081 to Schmidt; U.S. Pat. No. 6,506,311 to DeGarmo et al.; U.S. Pat. No. 6,534,105 to Kartchner; U.S. Pat. No. 6,638,757 to Teran et al.; U.S. Pat. No. 6,716,360 to Titmas; U.S. Patent Applications 2002/0122850 by Kartchner, 2003/0098227 by Okamoto et al. and 2004/0055716 by Landalv et al., the disclosures of which are incorporated herein by reference in their entirety.

Another problem existing in waste treatment and disposal operations is air pollution, including greenhouse gas emissions, including methane and $CO_2$, and emission of gases having noxious odors, such as slaughterhouse and rendering plant operations. As residential housing areas have expanded, many have encroached on land adjacent to various food processing and other industrial operations, and complaints from residents regarding the noxious odors escalate. The prior art has offered little to satisfactorily and economically address the problems of controlling and preventing noxious odors from industrial manufacturing facilities and waste disposal facilities.

There is also a general problem of removal of water from high water content, dilute process streams, whether it is a waste stream, final product stream or an intermediate process stream. The removal of water from process streams having a high water content is costly, energy intensive and time consuming.

It is apparent from the above that there is a substantial unmet need for environmentally and economically acceptable technologies for disposal of various waste materials, for control of noxious and greenhouse gases, for conversion of wastes into useful or recyclable products and for efficient and economical removal of water from high water content process streams. The present invention is directed to methods, apparatus, systems and products for meeting some or all of these needs.

SUMMARY OF THE INVENTION

The present invention provides economical and simplified methods, systems and apparatus for converting organic and inorganic waste materials into products that are useful as animal feed, fuels, recyclable materials for processing and other uses. The present invention further provides economical and simplified methods, systems and apparatus for controlling and containing noxious, odoriferous and greenhouse gases from various industrial and waste treatment operations.

In one aspect, this invention provides a method for processing a waste material feedstock comprising operating a gas turbine generator to produce electricity and exhaust gases; contacting the exhaust gases with the waste material feedstock having a moisture content of at least about 30% by weight in a dryer vessel for a contact time sufficient to produce, without significant oxidation of the waste material feedstock, a dried material having a moisture content less than about 20% by weight; and optionally provides for processing and forming the dried material into a granular, pellet or prill product form suitable for conventional handling and transport.

In another aspect, this invention provides a method for processing a waste material feedstock comprising operating a gas turbine generator to produce electricity and exhaust gases having a temperature greater than 1,000° F.; contacting the exhaust gases having a temperature greater than 1,000° F. with waste material feedstock having a moisture content of at least about 30% by weight in a dryer vessel for a contact time sufficient to produce a dried material having a moisture content of less than about 20% by weight, and optionally provides for granulating, pelletizing or prilling the dried material into a product form suitable for conventional handling and transport. Optionally, the contact of the exhaust gases and the waste material feedstock is conducted without significant oxidation of the waste material feedstock.

In another aspect, this invention provides apparatus for drying and/or converting waste material feedstock comprising a gas turbine in combination with a dryer vessel adapted for receiving waste material feedstock and for receiving the exhaust gases from the gas turbine through a connection; wherein the connection between the gas turbine and the dryer vessel is adapted to substantially preclude the introduction of air into the dryer vessel and optionally provides the dryer vessel adapted for such drying and/or converting the waste material feedstock by direct contact of the exhaust gases and the waste material feedstock.

In another aspect, this invention provides a portable system for processing waste material feedstock comprising at least one portable dryer unit adapted for drying or heat treating a waste material feedstock to produce a dried or altered material and at least one portable processing unit adapted for converting the dried or altered material from the dryer unit into a product having a form suitable for conventional handling and transport, and optionally further provides such a portable system wherein the dryer unit comprises a gas turbine and a dryer vessel. Further, the invention optionally provides such a portable system wherein the gas turbine and dryer vessel are connected by an arrangement adapted to pass the gas turbine exhaust gases into the dryer vessel and to preclude the introduction of air into the dryer vessel.

In another aspect, this invention provides the above portable system comprising a first skid-mounted unit comprising the gas turbine generator adapted for producing electricity; and a second skid-mounted unit comprising the dryer vessel adapted for connection to the gas turbine to receive the gas turbine exhaust gases and to preclude the introduction of air into the dryer vessel. Optionally a third skid-mounted unit is provided comprising the processing unit. Preferably the portable systems of this invention comprise rail-mounted, truck-mounted or semitrailer-mounted units. In another aspect, this invention provides the portable system, comprising the gas turbine and dryer vessel, plus an optional processing unit, configured and sized for a single skid-mount or truck-mount installation. Another optional aspect comprises an enclosure or enclosures for the portable units, primarily for operating noise attenuation as well as protection from weather conditions.

In another aspect, this invention provides a product comprising a waste material feedstock thermally treated at sufficient temperatures and without significant oxidation for a sufficient period of time to destroy or convert to acceptable forms substantially all undesired components present in the waste material feedstock, which comprise undesired organisms, microorganisms, pesticides, antibiotics, hormones, prions or viruses. Preferably the product contains less than detectable levels of each such undesired component not so destroyed or converted, and optionally further provides such thermally treated material in the form of a product suitable for conventional handling and transport. This invention further provides a product comprising thermally treated waste material feedstock which contains $NO_x$, $SO_x$ or $CO_x$ components absorbed or complexed therein as a result of contact of the waste material feedstock with gas turbine exhaust gases in a confined space in the absence of significant oxidation of the waste material feedstock.

In another aspect, this invention provides a dried or altered material or product comprising a waste material feedstock thermally treated at sufficient temperatures without significant oxidation and for sufficient period of time to provide a self-binding product suitable for conventional handling and transport.

In another aspect, this invention provides a system for processing greenhouse gases and noxious or odoriferous gases from waste material feedstock and/or such gases emitted by the facility producing a waste material feedstock comprising a gas turbine having a combustion air intake and a facility having ventilation air exhausted from the facility, wherein the combustion air intake is adapted to receive at least a portion of, and preferably substantially all of, the ventilation air exhausted from the facility. The gas turbine can optionally comprise a gas turbine generator and can optionally include a dryer vessel adapted for receiving the gas turbine exhaust and for receiving and heat treating waste material feedstock. In an alternative aspect, this invention provides said systems for processing manufacturing gases and noxious or odoriferous odors or gases through the combustion air intake of a reciprocating engine, which can optionally include an electric generator and can optionally include a dryer vessel adapted for receiving the engine exhaust.

In another aspect, this invention provides apparatus for treating waste material feedstock comprising a gas turbine having a combustion air intake adapted to receive ventilation air from a facility producing waste material feedstock, a dryer vessel having a connection adapted for receiving exhaust gases from the gas turbine and having an inlet for receiving waste material feedstock. Optionally the combustion air intake can be adapted for connection to the facility ventilation system whereby the combustion air intake receives substantially all the ventilation air exhausted from the facility. Additionally in this aspect, the connection between the dryer vessel and the gas turbine exhaust can be adapted to substantially preclude the introduction of air into the dryer vessel.

The above aspects and other aspects will be apparent to one skilled in the art from the disclosure herein.

BRIEF DESCRIPTION OF THE DRAWINGS

FIG. 4A is a plan view and FIG. 4B is an elevation view of an illustration of a configuration of the system of this invention mounted on a semitrailer truck.

DESCRIPTION OF THE INVENTION

Figure 1:
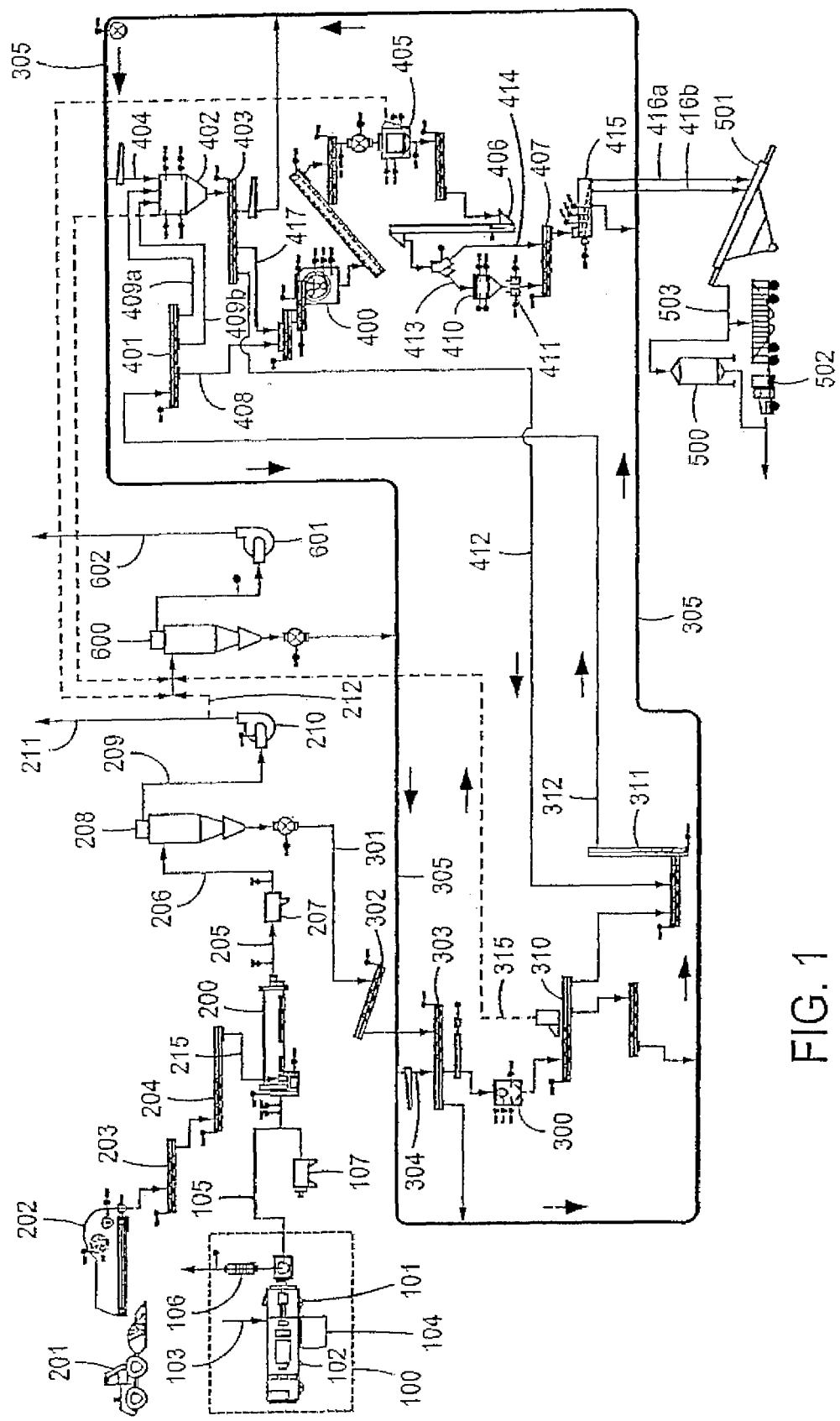
FIG. 1 is a schematic diagram of a process for treating waste material feedstock using the process and equipment in accordance with the present invention.

This invention provides an economical, efficient and simplified solution to the increasingly severe problem of environmental pollution caused by waste material and gases from industrial operations. Prior art methods and systems provided to date either are not sufficiently effective in conversion of such waste material and gases to a safe, environmentally acceptable form or are not adaptable to be economically feasible for small as well as large commercial operations. Other problems exist with many of the prior art systems, including uneconomical to operate, failure to decontaminate and failure to prevent air pollution (or in fact causing additional environmental problems in the operation of the process).

Examples of the prior systems and their deficiencies include the following. Digestion processes, whether aerobic or anaerobic, are slow, inefficient and produce a sludge that must be disposed of, typically in a landfill. Digestion or composting systems designed to produce biogas, typically methane, for fuel do not provide economically beneficial production of fuel and are costly to operate, because the fuel produced is not produced at a sufficient rate, is not of sufficient thermal value for economic operation, is a "dirty" fuel in that it produces environmentally unacceptable emissions when burned and/or is difficult to burn efficiently due to its variable content. This variable and inconsistent content of contaminants and fuel value can actually damage some systems, such as gas turbines, due to corrosion or uncontrollable, unpredictable burning conditions. Digestion and composting systems designed to produce a usable sludge have the drawback that such sludge products produced are not usually free of biologic or chemical contaminants that are undesirable or prohibited for use or disposal, such as on crop land. Consequently, biogas production operations produce a depleted sludge that is costly to dispose of in an environmentally acceptable way, which is frequently in a landfill operation qualified to take such sludge.

Treatment systems that employ heat and chemical treatment are inefficient and frequently ineffective in producing a safe final product. These include pH adjustment and chemical additives, usually with heating to help kill organisms present. Some heat treatment systems employ pressure (for higher temperature cooking), microwave heating, radiation and other supplemental treatments, which only serve to add to the cost of operation with diminishing benefit in product quality or environmental cleanup. In many cases the additional complexity of treatments and combinations of process steps results in more negative environmental impact from the resources employed and byproducts produced than is achieved in beneficial environmental impact from the total treatment. Many systems produce alternative or additional byproducts that are contaminated or cause collateral environmental pollution in their operation. Systems that involve incineration, partial incineration, gasification or pyrolysis are similarly inefficient and not sufficiently effective, because incineration produces additional effluents that must be contained to prevent alternate or additional air pollution. Also, while incineration and pyrolysis systems produce a product that may be sufficiently sterilized, the product may contain other undesirable byproducts of the incineration and pyrolysis such as carcinogens, making the product unsuitable for animal feed, recycle or other desired uses, thus requiring undesirable disposal in landfill. And, incineration or partial incineration systems carry the additional risk of potentially uncontrollable or flash fires, which at a minimum damages the processing equipment and at worst poses safety issues.

Prior art systems have not satisfactorily addressed the problem of noxious gases and greenhouse gases that are produced in industrial manufacturing operations and in waste material treatment operations. Sources of such gases are the manufacturing processes themselves, the waste material produced and the bioconversion or decomposition of the waste material. These gases are typically vented or released to the atmosphere, but may be objectionable to nearby residents due to the noxious odors and are environmentally objectionable due to the atmospheric pollution caused by the greenhouse gases contained therein.

The present invention provides new technology in the form of processes, apparatus and systems for conversion of waste material feedstocks to useful, environmentally acceptable materials and products. In addition, the present invention provides technology which reduces or eliminates the undesirable environmental impacts of noxious and greenhouse gases produced in manufacturing operations and in bioconversion of waste materials from the manufacturing operations. One major advantage of the present invention resides in the aspect that, in most waste material feedstock processing according to this invention, all waste solids can be optionally contained within the processes and systems and become part of the final product produced by the processes and systems of this invention. Thus, the present invention can completely eliminate the necessity of disposing of any remaining sludge or other solids in a landfill by converting and/or incorporating all the waste material feedstock solids into the final product.

The term "waste material feedstock" is used herein to mean and include waste matter which comprises organic matter and which comprises inorganic matter, or mixtures thereof. Included in the organic waste matter category are: woody or cellulosic and chemical waste products from agricultural operations, such as bagasse, rice hulls, straw, alfalfa, orchard and vineyard prunings, citrus pulp, corn cobs, beet pulp, hatchery waste, yard wastes, landscaping wastes, mushroom growing wastes, etc., from forestry and lumber operations, such as scrap wood, sawdust, bark, limbs, etc., from pulp and paper operations, including Kraft mill black liquor from sulfate pulping, from de-inking mill operations, from nursery operations, such as dead or diseased plants and from building demolition and construction; mixed plastics or automobile shredder residue (ASR); food processing wastes from processed or pre-processed food product manufacturing, such as such as frozen foods, pre-prepared, ready-to-eat salad mixes, heat-and-serve meals, canned foods, and food services businesses, such as restaurants, institutional meal providers, airline meal providers, etc.; residual meat, bones, offal, skin, poultry waste, feathers, feather meal, hair, hair meal, seafood meal, blood, blood meal, bone meal etc. from slaughter house and meat and fish packing operations; livestock, poultry and pet carcasses from farms, feedlots, slaughter houses, and veterinarian clinics, including cattle, sheep, goats, hogs, horses, chickens, geese, ducks, and virtually any other animal from any source of carcasses, body parts, organs or tissues that must be disposed of; body parts, organs and tissues from medical facilities; fermentation and distillation operation wastes, such as soy sauce waste, wine and sake lees, tofu refuse, grape skins and seeds, mash and sour mash residue, etc.; cheese making operations, recycle waste operations, such as paper, plastics, tires, foamed styrene, cardboard, etc. and other servicing, processing and manufacturing operations that involve organic materials. Included in the inorganic matter category are: product streams, waste streams and materials from mining operations, iron and steel mill operations, foundry operations, well drilling operations, production of zinc borate, zinc oxide, magnesium oxide, silicon dioxide, titanium dioxide, alumina trihydrate, ceramic fibers, iron oxide, gypsum, gypsum board, silica, lime, calcium carbonate and the like. Another feedstock useful in this invention is contaminated soil for remediation processing, e.g., soil contaminated with hydrocarbon fuels, pesticides, nitrates and the like. As will be apparent to one skilled in the art, mixtures of organic and inorganic waste materials will be useful in this invention. The preferred waste material feedstock for use in this invention is that with a high water content, which makes that feedstock uneconomical or undesirable to treat or process by prior art methods. Large components of a waste material feedstock, such as prunings, building demolition materials, fruit pits, tires, bones, carcasses, etc., preferably are comminuted or shredded to particle sizes suitable for processing in the systems and equipment selected for carrying out this invention. The sizing may be done using any suitable equipment, such as mills, choppers or shredders. Sizing should be done in an enclosed environment to avoid aerosol pathogen emissions into the outside environment. Typically, the waste material will have a high water content, as discussed below. The term "waste material feedstock" is also used herein to include intermediate products and raw materials for further processing into other products which are not waste products. For example, this invention can provide efficient processes and systems for removal of water from process streams and/or provide heating to thermally convert or react a product stream to a converted or reacted product (in batch or continuous operations). Other examples of the various uses of this invention include drying and treating slaughterhouse waste to produce a slurried or solid (e.g., granulated) animal feed having significant protein and/or calcium content; processing lumber and paper manufacturing wastes or intermediate streams to produce recyclable cellulose, paper or wood materials or products useful in manufacture of particle board, cardboard, etc., or to produce a solid cellulose or wood product useful as a fuel; drying and processing potato peelings and other waste from potato processing facilities to produce an animal feed supplement or a fertilizer/soil builder product; removing water from and/or converting (cooking, pasteurizing, sterilizing, etc.) process streams in human food production facilities, such as production of oatmeal, corn flakes, corn syrup, corn meal, mashed potatoes, sugar, milk, cheese, snack foods and other food products such as pet food; and removing water from and/or converting or reacting process streams in drug, chemical and other manufacturing facilities. As is apparent, the systems and processes of this invention can be used to process a feedstock by dehydration without conversion or reaction, by conversion or reaction without dehydration, or by any combination or proportion of both. The systems and apparatus of this invention can also be adapted for installation at particular individual facilities to intercept the waste streams therefrom and prevent such waste streams from entering and burdening municipal sewage treatment facilities. For example, large food processing facilities for producing prepared meals for institutions, airlines, etc., normally dump their waste food materials in a municipal sewer or landfill. Waste processing systems and units according to this invention can be sized and installed at such a facility to process such waste food materials to produce a useful product, such as an animal feed or a fertilizer/soil builder product which has economic value, and to reduce the burden on the municipal sewage treatment facilities. With many municipal sewage treatment facilities reaching full capacity and the cities being faced with major capital expenditures to build new or expanded facilities, this invention provides an economically attractive alternative by processing waste streams on site at large manufacturing facilities to produce a useful product and relieve the burden on the municipal sewage system. The systems of this invention can also be adapted to sanitarily treat, on site, raw sewage, organic hazardous waste, etc., from office buildings, hospitals, hotels, etc., to produce, on site, a fertilizer, recyclable or safe disposal product, thus further relieving the burden on the municipal sewage system. This aspect of this invention being designed for processing animal waste material and municipal sewage, is disclosed in commonly assigned copending U.S. patent application Ser. No. 11/184,739 filed on even date herewith, the disclosure of which is incorporated herein by reference in its entirety.

The present invention provides a simplified, economically efficient alternative to the prior art which provides in its preferred aspects, a 100% usable product which provides 100% conversion of waste material feedstock solids into useful products and which eliminates the problem unsolved by the prior art of disposal of solids left over from various waste material feedstock treatments. The present invention is principally useful, depending on the waste material feedstock to be processed, in processing waste materials into food products, animal feed products, fuel products, fertilizer or soil builder/soil supplement products, products suitable for efficient recycle, remanufacture, reuse or transport, and safe products suitable for environmentally acceptable disposal. According to the present invention, the animal or plant nutrient values in the product from a waste material feedstock can be maximized if composting, digestion, incineration and oxidation of the waste material feedstock are avoided or at least minimized. In this invention, the high temperature treatment of waste material feedstock, preferably by direct contact with hot gases, e.g., >1,000° F., destroys or converts to harmless forms substantially all undesirable components present in the waste material feedstock, including organisms, microorganisms (including genetically modified organisms, bacteria, pathogens and other microorganisms), seeds, pesticides, antibiotics, hormones, prions and viruses, particularly when such heat treatment takes place for a sufficient time and without significant oxidation, incineration or pyrolysis of the waste material feedstock. The treatment at sufficiently high temperatures for a sufficient amount of time in the absence of significant oxidation and/or pyrolysis "cooks" or otherwise converts or transforms the waste material feedstock into a self-binding product, whereby it can be formed into conventional pellets, granules, prills or other forms, usually without the need for addition of binders or other agglomerating additives, which have sufficient physical hardness and strength to be used in conventional product handling and transport equipment and operations. Additionally, the present invention processes and systems can be adapted to produce liquid or slurry products that comprise waste material feedstocks (including intermediate process streams or intermediate products) that have been dehydrated to the desired moisture content level and/or have been converted, reacted or altered physically and/or chemically as desired. This invention also provides for recovering and recycling the water removed from the waste material feedstock, which water can be used for process water, livestock water, irrigation or other industrial uses, and for recovering and recycling all solids (fines or other) produced in the process, so that there are no significant solid products produced or resulting from this invention other than the desired products suitable for commercial use. The selection and adaptation of the processes, apparatus and systems of this invention to treat or process a particular feedstock to produce a particular desired solid, liquid or slurry product for end use, recycle or disposal will be apparent to one skilled in the art from the disclosure herein.

According to this invention, a most efficient way of providing the hot gases for contact with the waste material feedstock is the exhaust from a gas turbine, and preferably a gas turbine electric generator. According to the system of this invention, the gas turbine is fueled from locally available conventional fuel sources, because conventional fuels provide the most efficient, reliable and controllable operation of the gas turbine. The electricity produced from the gas turbine generator is preferably sold back into the local power grid as a revenue source for the operation of this invention, but the electricity can be used internally in the operation of the system of this invention or in other nearby operations as a supplemental source of power or in a combination of uses for power and heat recovery from the processes employed in this invention. It is preferable and more efficient in the operation of this invention to merely sell the electric power produced to the local power grid. This enables varying the operation of the processes and equipment of this invention in the most efficient and effective manner for treatment of the waste material feedstock to produce the desired quality and quantity of products without concern for or being constrained by any particular minimum or necessary level of electricity output or the need for an unchanging level of electricity output.

One important feature of the process and apparatus of this invention is that the gas turbine and the waste material feedstock dryer vessel receiving the exhaust gas from the gas turbine are connected together such that induction of outside air into the dryer vessel is precluded and the dryer vessel preferably receives the exhaust gases directly from the gas turbine. It is preferred that 100% of the gas turbine exhaust gases are passed into the dryer vessel and, for most efficient operation, preferably without passing through any intervening heat exchanger, silencer or other equipment in order that the dryer vessel receives the maximum heating from the gas turbine exhaust. But, it is recognized that excess exhaust gases not needed for the dryer vessel operation can be diverted to provide heat required in other steps in the systems of this invention or in other nearby operations. It is also preferred that the exhaust gases result from conventional and efficient combustion ratios in the gas turbine so that the exhaust gases contain minimum or limited amount of free oxygen, essentially no unburned fuel, no exposed flame and that the optimum exhaust gas temperature (EGT) is achieved, for maximum heat produced, per unit of fuel consumed. If desired, combustion can be at stoichiometric ratio for peak EGT operation at maximum temperature and maximum heat input for the process and system of this invention. The absence of excess oxygen in the exhaust gases, precluding outside air induction into the dryer vessel, the absence of exposed flame and operation at the temperatures set forth herein prevents significant oxidation of the waste material feedstock in the dryer vessel, preserves the maximum nutrient value in the waste material feedstock for containment in the end product and, when the output of the dryer vessel is a dry, oxidizable material, prevents the danger of fire damage to the equipment and provides an operation safe from flash fires in the dryer vessel. The absence of excess fuel in the exhaust gases prevents the exhaust gases from being a source of hydrocarbons that must be scrubbed from the vapor effluent from the operation of this invention before being released into the atmosphere. In other preferred operations of this invention it may be desired or essential that air or oxygen be introduced in controlled quantities or ratios to provide a desired oxidation or chemical conversion of the waste material feedstock in the dryer vessel.

In the operation of the processes and apparatus of this invention, it is preferred that when the waste material feedstock is an organic material, it should be as fresh as possible with a high moisture content. In other words, such a waste material feedstock should have undergone no, or as little as practical, composting, decay, digestion or other bioconversion prior to processing according to this invention. This provides the highest nutrient value and organic matter content in the final product and is desired where the product produced is a food product, an animal feed product, a fertilizer or soil builder product or other product where nutrient value or organic matter content is important. This preferred aspect is efficiently achieved by a preferred design of the systems of the present invention, which is the modularization of the process units in skid-mounted or other form suitable for transport by truck. This enables the entire system of this invention to be sized appropriately and placed on-site at various operations and manufacturing facilities and enables processing of the waste material feedstock from such operations and facilities immediately after it is produced. This preferred system for such operations provides additional economic and environmental efficiency, because it eliminates the cost and environmental impact of transporting any waste material feedstock to a distant location for processing or disposal. Eliminating the necessity of transporting waste material feedstock from one location to another also provides the benefit of biosecurity between facilities, i.e., it eliminates the transport and spread of harmful or undesirable plant and animal diseases. This design also enables custom or jobber waste material feedstock processing where the truck mounted units are easily moved from one waste material feedstock production or accumulation site to another, in order to maximize the utilization of the capital investment in the equipment systems employed for carrying out this invention. Such portability also enables full utilization of the equipment of this invention, which can be scaled to an appropriate size for efficient, economical operation, so it can be used on a part time basis at each of several different operation or manufacturing locations in a particular area where a permanent installation at any single location is not needed or is not economically justifiable. The system of this invention can also be scaled to appropriate size for an individual operation or manufacturing location to operate full time to continually process the waste material feedstock continually produced in that location, so that waste material feedstock stockpile or excess waste material feedstock at any time the manufacturing facility is in operation is minimized.

For use in this invention, it is preferred that the waste material feedstock have a high moisture content, such as at least 30% by weight water, preferably at least 50% and most preferably at least 70%. The high water content facilitates mechanized handling of the raw material and preparing it for use by blending and mixing for uniformity of feedstock. Typically the waste material feedstock is moved by augers, front end loaders, back hoes, conveyor belts and the like, particularly in slaughterhouse, farm, forestry, landscape and similar operations. However, in those and other operations the waste material feedstock may be prepared in the form of a pumpable slurry, where the water content of the waste material feedstock may be as high as 90%, 95% or even 98%. In addition, the waste material feedstock may be a solution with all solids dissolved therein, where the solids are precipitated out as the water is evaporated from the feedstock in the processes and systems of this invention. The present invention can efficiently and economically process such high water content waste material feedstocks to not only recover the solids content in the form of a final product, but to also recover the process water, which can be recycled for industrial or process use, for livestock drinking water, for crop or landscape irrigation, etc. This invention can handle high water content waste material feedstocks efficiently and economically due to the fact that excess steam produced in the dryer vessel can be used downstream, upstream or in other nearby operations, such as for preheating waste material feedstock, process heat, etc. Instead of holding high water content waste material feedstocks in open ponds, as is conventionally done in many industrial and manufacturing operations, this invention enables holding the waste material in enclosures or tanks for essentially immediate processing, which eliminates the air pollution, odor and environmental problems associated with open ponds. This invention can be adapted as disclosed herein, to contain and process not only the water and solids but also the gases produced in a manufacturing operation. In some cases it may be desirable for economic operation reasons to mechanically separate part of the water from high-water content waste materials, e.g., by centrifuges, filters or presses, before processing the waste material in the system of this invention. Such separated water can be recycled for use as disclosed above.

It is recognized that a raw waste material feedstock will typically contain other material such as straw, twine, wire, gravel, rocks, jute or plastic bags, etc. Such materials are processible as part of the waste material feedstock in the present invention without detrimental effect, provided the levels of such other materials are not unusually high. However, it is normally preferred to separate out such materials, particularly rocks, wire and the like, that might damage the dryer vessel or downstream processing equipment. Otherwise, it may be desirable to prepare the waste material feedstock by chopping, grinding or other preparation to comminute items such as twine, bags and the like into small pieces so they can be processed into the final product without significant interference with the normal operation of the processes and apparatus of this invention or with the end use of the product. It should be noted that such materials that are either inert or are biodegradable can be contained in the fertilizer product without detrimental effect, which may be particularly desired where it is not economically efficient to remove such materials from the waste material feedstock or during processing according to this invention. The waste material feedstock preparation by grinding, chipping, chopping, crushing, etc., not only will improve the uniformity of the feedstock for processing, but will also facilitate addition of other materials into the feedstock, such as straw, woodchips, yard waste, etc., as referred to above. In addition the waste material feedstock preparation can include a washing step, which may be useful in very dry waste material, to remove excess salt content or other components that may not be desired in a final product.

The term "gas turbine" is used herein to mean and include any turbine engine having a compressor turbine stage, a combustion zone and an exhaust turbine stage that is capable of producing exhaust gas temperatures of at least 500° F., preferably at least about 700° F., more preferably at least about 900° F. and most preferably greater than about 1,000° F. Gas turbines are the heat source preferred for use in this invention because of their efficient operation and high heat output. The gas turbine generator is further preferred for use in this invention due to the production of energy by the generator, which energy can be utilized or sold to improve the economics of the operation of the system of this invention. The generator will typically be an electric generator due to the convenience of using and/or selling the electricity produced. However, the generator can be any other type of energy generator desired, such as a hydraulic pump or power pack that can drive hydraulic motors on pumps, augers, conveyors and other types of equipment in the system of this invention or equipment in other nearby operations. The heat requirements and the system economics will determine whether a gas turbine or gas turbine generator is used. If it is desired to have higher temperature exhaust gases and higher heat output from a given smaller size gas turbine, it may be desired to use a gas turbine instead of a similar size gas turbine generator. Compared to the gas turbine, the gas turbine generator further expands and cools the exhaust gases in absorbing energy to drive the generator, where in a gas turbine that energy is contained in higher temperature gases available for use in the dryer vessel of this invention. This can be an option when it is economically more important in the practice of this invention to have small (truckable) high temperature units than to have the revenue stream or economic benefit of the electricity or other energy production by the gas turbine.

The gas turbine or gas turbine generator useful in this invention can be fueled from any available source with any suitable fuel for the particular gas turbine and for the process equipment designed according to this invention. The preferred and conventional fuels are sweet natural gas, diesel, kerosene and jet fuel because the gas turbines are designed to run most efficiently on good quality fuels of these types and because of their common availability, particularly at remote agricultural operations, where the units of this invention are often most efficiently located. However, other fuels that can be used to fuel the gas turbine include methane, propane, butane, hydrogen and biogas and bioliquid fuels (such as methane, oils, diesel and ethanol). Since the system of this invention does not produce a biofuel, the fuel for the gas turbine used in this invention must be available at the local site where this invention is utilized. If fuel is not available locally, a fuel such as diesel can be trucked to the site as needed.

Examples of commercially available gas turbines and gas turbine generators useful in the present invention include the following (rated megawatt (MW) outputs are approximate):

Rolls Royce Gas Turbine Engines Allison 501-KB5, -KB5S or -KB7 having a standard condition rated output of 3.9 MW European Gas Turbines Tornado having rated output of 7.0 MW Solar Mars 90 having rated output of 9.4 MW and Solar Mars 100 having rated output of 10.7 MW Solar Tarus 60 having rated output of 5.5 MW and Solar Tarus 70 having rated output of 7.5 MW For a nominal product output capacity of 2.5 metric tons/hr. (2,500 kg/hr) a gas turbine generator size of about 4 MW can be used, depending on the heat insulation and heat recovery efficiencies designed into the overall system. For small single semitrailer or truck systems, the units may be scaled smaller. For smaller product output systems, such as an 0.3 metric ton/hr product output, small gas turbines, such as Solar Saturn 0.8 MW, Solar Spartan 0.2 MW or Capstone 0.5 MW or 0.3 MW generators, can be used depending on system efficiencies and required heat input ranges. It will be recognized that systems according to this invention can also be designed to utilize the exhaust gas heat from reciprocating engines, such as gasoline or diesel generators.

The dryer vessel employed in this invention can be any type or configuration that is suitable for drying the waste material feedstock available and that can be adapted for receiving the gas turbine exhaust gases and receiving the waste material feedstock without allowing a significant amount of outside air to enter the drying chamber in the dryer vessel where the exhaust gases contact the waste material feedstock. The objective of the design of the gas turbine exhaust connection to the dryer vessel for purposes of this invention is to preclude any significant outside air from entering the dryer vessel to help prevent significant oxidation of the waste material feedstock. As previously pointed out, this is preferred to preserve the organic matter, carbonaceous and/or nutrient values present in those types of waste material feedstocks, to prevent fires and to provide a safe operation. As used in this invention it is preferred and expected that the turbine will be operated at a conventional ratio of fuel to combustion air in order to produce the most efficient exhaust gas temperature (EGT) for the dryer vessel and to produce gases entering the dryer vessel that contain a minimum of free oxygen. It will be recognized by those skilled in the art from the disclosure of this invention, that alternate sources of hot gases other than a gas turbine can be used and connected to the dryer vessel, such as the exhaust from conventional oil or gas burners and reciprocating engines, provided they are operated at conventional combustion ratio conditions to minimize free oxygen, or at stoichiometric ratio for no free oxygen, in the exhaust and are connected to the dryer vessel in a fashion that precludes significant outside air from entering the dryer vessel in order to preclude significant oxidation of the feedstock. Of course, such an alternate and additional source of hot gases can optionally be connected to the dryer vessel according to this invention and be used to supplement the exhaust gases output of the gas turbine in order to provide additional heat input capacity for the dryer vessel if needed for start up, shut down or surge load conditions or for backup in the event the gas turbine goes off line.

It will be recognized that in some operations of this invention, not all outside air can be excluded and oxidation of the waste material feedstock cannot be completely precluded, primarily because of the air present in and entrained in the waste material feedstock, the air dissolved in the moisture present in the waste material feedstock and excess oxygen that may be present in the turbine exhaust gases during periods that stoichiometric ratio of fuel and air is not achieved. In addition, in some cases oxygen may be produced or liberated from the organic or other materials present in the waste material feedstock when the thermal treatment and conversion takes place and decomposes or converts such materials. Therefore, the terms as used herein which refer to "preclude introduction of air," "without significant oxidation," and the like, are used in the above operational context and with the recognition and intended meaning that the air or oxygen entering the system as part of the waste material feedstock or exhaust gases or produced in the thermal conversion process is not intended to be precluded and that the oxidation that may occur as a result of that air entering the system with the waste material feedstock is not intended to be prevented. However, such a level of oxidation is not considered significant within the scope, context and practice of this invention or the meanings of those terms as used herein. Similarly, "without significant pyrolysis" is used herein to mean that not more than an insignificant portion of the waste material feedstock is pyrolized, e.g., as in U.S. Pat. No. 6,039,774. Pyrolysis products are undesirable in the processes and products of the present invention, and the processes and equipment of this invention are operated to achieve the desired drying of the waste material feedstock and the desired conversion and destruction of various waste material feedstock components, such as pesticides, prions, organisms, seeds, etc., but operated to avoid significant oxidation and preferably to avoid significant pyrolysis, or at least to minimize oxidation and minimize pyrolysis. Following the disclosures herein, it will be apparent to one skilled in the art for some applications of this invention, to control the exhaust gas temperatures, the contact times and/or residence times in the dryer vessel, the moisture content of the solids and of the vapor phase in the dryer vessel and other variables in order to process a particular waste material feedstock to achieve these desired results and to maximize the nutrient value in the final products. In other applications of this invention the temperatures, contact times and other operating parameters of this invention can be adapted to achieve a desired level or degree of oxidation or pyrolysis, if the properties of the final product to be made using the systems of this invention require oxidation or pyrolysis of the feedstock.

Dry or low moisture content waste material feedstock is likely to have more air entrained in the interstices among the particles than wet or high moisture content waste material feedstock, and elimination of such entrained air from a dry waste material feedstock before introduction into the dryer vessel may not normally be economically practical. However, consistent with other operational aspects of this invention, it is often preferable to use high moisture, low air content waste material feedstock, and may be preferable to add water to a dry waste material feedstock to displace air therefrom before processing in the systems of this invention. Minimizing introduction of air and oxygen into the dryer vessel is preferred to prevent significant oxidation of the nutrient components of the waste material, as well as other components of the feedstock, such as straw, dust, etc., that might pose a fire or safety hazard if excess air or oxygen were present in the dryer vessel.

Exclusion of outside air is also preferred for economic efficiency as well, because heating excess or outside air along with heating the waste material feedstock reduces the efficiency of the process. In some instances where the waste material feedstock is very low in moisture content or too dry for preferred operation of this invention, water can be added to the feedstock, to the turbine exhaust, to the turbine intake or to the dryer vessel to raise the moisture level in the dryer vessel to a level for efficient operation and to produce a solids material from the dryer vessel with a desired moisture content and desired self-binding properties. Addition of water to a dry waste material feedstock followed by mixing, kneading or pressing, such as in windrow mixing and pressing with a roller, can also serve to displace air from the feedstock before being introduced into the dryer vessel. In the case of very dry waste material feedstocks, water may be considered a process aid added before entry into the dryer vessel.

It will be recognized that the operation of the dryer vessel is normally to dry or reduce the moisture content of the waste material feedstock, but it is to also achieve the high temperature heating of the waste material feedstock to convert or destroy undesired components and to achieve a chemical or thermal alteration in the feedstock to provide properties desired in the final product. As noted, one aspect of this invention is the thermal conversion of the various components of the waste material feedstock without significant oxidation from the outside air. Since the specific components of waste material feedstocks are numerous and varied, it is not clearly understood what specific chemical reactions may be taking place in the various thermal conversions, and applicants do not wish to be bound by specific theories or speculation regarding same. However, certain observations have been made, and the understanding of the following observations will further enable one skilled in the art in effectively and efficiently practicing this invention.

First is the thermal conversion and destruction of undesirable components, such as organisms, chemicals, etc., as discussed elsewhere in this disclosure. Second is the thermal conversion, chemically or physically, of various components in the waste material feedstock. For example, the product produced can be an essentially self-binding solid product that can be made into high physical strength pellets, granules or prills without the addition of binders or similar materials. While conventional binders for forming pelletized, granulated or prilled solid products can be used in the practice of this invention, it is preferred to operate at thermal treatment temperatures and residence times to produce a material that is self-binding and can be pelletized/granulated/prilled without added binders. It is believed that to some extent, when the organic matter in the feedstock is chemically altered and/or thermally converted, similar to being "cooked," it transforms ligands, cellulose, starch, carbohydrates, etc., into materials that can act as binders in the final product. This provides a binding profile to enable formation of a final product having particle strengths and free flowing anticaking and nonfriable properties that make it useful in conventional dry product handling, transport and application equipment. Waste material feedstocks that range from very high to very low proportion of organic matter present can be converted to self-binding materials that will form good strength pellet, granule or prill products without additional binders added. Of course, additional binders may be added to enhance the strength properties of any of the final solid products of this invention, if desired. Third is the recognition that in some operations of processing a very low moisture content waste material feedstock, there may actually not be any significant drying taking place, i.e., the moisture content of the feedstock entering the dryer vessel may be essentially the same as the material exiting the dryer vessel, so the dryer vessel is essentially acting as an oven. In this case, the important processing taking place is the thermal treatment or conversion and/or chemical alteration ("cooking") of at least a portion of the organic matter or other components present in the feedstock.

The types of dryer vessels that can be used in this invention are, for example, the following:

Rotary drum with or without internal scrapers, agitation plates and/or paddles

Stationary "porcupine" drum dryer with or without scrapers and/or agitator plates and/or paddles Triple pass stepped drying cylinder or rotary drum dryer systems with or without scrapers and/or agitator plates and/or paddles Rotary drum dryer systems with or without steam tubes and with or without scrapers and/or agitator plates and/or paddles Turbo-dryer or turbulizer systems Conveyor dryer systems with or without scrapers and/or agitator plates and/or paddles Indirect or direct contact dryer systems with or without scrapers and/or agitator plates and/or paddles Tray dryers Fluid bed dryers Evaporator systems Baking ovens Examples of commercially available dryer vessels useful in or that can be adapted for use in this invention include:

Scott AST Dryer™ Systems

Simon Dryer Ltd.—Drum dryers

Wyssmont Turbo Dryer systems

Duske Engineering Co., Inc.

Energy Unlimited drying systems

The Onix Corporation dehydration systems

International Technology Systems, Inc. direct or indirect dryer systems

Pulse Drying Systems, Inc.

MEC Company dryer systems

Further examples of dryer vessels useful in or that can be adapted for use in this invention are disclosed in U.S. Pat. No. 5,746,006 to Duske et al. and U.S. Pat. Nos. 5,570,517 and 6,367,163 to Luker, the disclosures of which are incorporated herein by reference in their entirety.

As noted above the "dryer vessel" does not necessarily always function primarily as a dryer by removing moisture from the waste material feedstock in the system of this invention. The dryer vessel also functions as the thermal treatment/ conversion/alteration vessel or oven in which the waste material feedstock is heated to sufficient temperatures for sufficient times to produce the desired final materials and products as disclosed herein. In addition, the dryer vessel need not provide direct contact of the turbine exhaust gases or other heat source and the waste material feedstock, but can provide indirect heating of the waste material feedstock to achieve the drying and/or thermal treatment/conversion/alteration desired according to this invention. The dryer vessel can be lined with appropriate material to prevent or reduce corrosion, erosion or excessive wear. It will be recognized that the systems of this invention can be adapted to perform various functions in various configurations in a particular installation or operation. For example, two dryer vessels can be operated in series where a high water content feedstock is dried in the first dryer vessel then the output from the first dryer vessel is thermally treated in the second dryer vessel to achieve the desired chemical or physical conversion or alteration. In such an arrangement, the exhaust gases can be supplied from a single gas turbine exhaust split between the two dryer vessels, or can be supplied by two separate gas turbines. From this example it can be seen that the processes, apparatus and systems of this invention can be adapted to operate various equipment components in series or in parallel to perform various processing functions desired following the teachings of this invention to achieve the effective and economic operation thereof.

Another aspect of the dryer vessel adapted for use in this invention is that the dryer vessel preferably also functions as the silencer for the gas turbine or other engine providing the hot exhaust gases. It is well known that gas turbines, (essentially jet aircraft engines), produce a high level of noise impact on the nearby environment. Stationary gas turbines used for electric power production or other purposes are usually required by local, state and federal regulations to have silencers installed to muffle the noise of the exhaust of the gas turbine to acceptable levels. Such silencers have the economic disadvantages of cost and creating back pressure on the gas turbine exhaust, which reduces the efficiency of the gas turbine operation. One advantage provided by this invention, due to the connection between the gas turbine exhaust and the dryer vessel preferably being closed to outside air, is that the dryer vessel functions effectively as a silencer for the gas turbine. This is at least in part a result of the internal configuration construction of the dryer vessel acting in combination with the presence of the high water content waste material feedstock, which combination is effective in absorbing and muffling the gas turbine exhaust noise. This is also due to the downstream end of the dryer also being closed to the atmosphere, because the steam and off gases from the dryer vessel are collected for condensation, cleaning, recycling and for heat recovery in the downstream processing in a closed system before being vented to the atmosphere. It will be apparent to one skilled in the art that capability for venting at various points in the process and the equipment system may be desirable to accommodate startup, shutdown, upset or feedstock variability, but will normally be operated as a closed system having only final product output and clean gas venting. The turbine exhaust can optionally be partially or temporarily wholly diverted to other downstream units, bypassing the dryer vessel, when needed for supplemental heat in other process units or for startup, shut-down or upset.

Another advantage provided by this invention is that the steam and off gases can be pulled from the discharge end of the dryer vessel by an appropriate fan, vent blower, etc., to provide a reduced pressure at the upstream entrance of the dryer vessel, thereby reducing the back pressure on the turbine exhaust. This increases the efficiency of operation of the gas turbine and is made possible because the connection between the gas turbine exhaust and the dryer vessel is not open to outside air. It will be understood that the commercial system design may include a vent or even a conventional silencer connected by tee or other configuration into the connection between the gas turbine exhaust and the dryer vessel for use during startup, shut down or upset operation, but would not be employed in the normal operating configuration for the process and apparatus of this invention as described above. To achieve best efficiency of operation of this invention, it is preferred that the connection between the gas turbine exhaust and the dryer vessel inlet have no obstructions in order to deliver the exhaust gases to the dryer vessel with a minimum of heat and energy loss between the gas turbine and the dryer vessel. It will also be recognized from this disclosure, that the operation of a gas turbine generator will preferably be controlled for optimal efficiency or economics for the waste material feedstock drying, thermal conversion, chemical alteration and other processing needs, which may not be the optimal or best gas turbine operating conditions for electricity production. The electricity production is a cost recovery revenue stream for the system, but the overall economics of the operation of this invention may be better under gas turbine operating conditions that favor optimum exhaust heat output for efficient dryer vessel operation and downstream production of products having desired properties and disfavor electricity production. Determination of such operating conditions for a particular installation of this invention will be apparent to one skilled in the art following the teachings herein. Gas turbine control systems of this type are disclosed in commonly assigned copending U.S. patent application Ser. No. 11/185,433 filed on even date herewith, the disclosure of which is incorporated herein by reference in its entirety.

Another advantage provided by this invention results from the contact of the gas turbine exhaust gas with the waste material feedstock in the confined space of the dryer vessel without significant outside air present. The $NO_X$ and $SO_X$ emissions, and to some extent CO and $CO_2$ emissions, in the gas turbine exhaust are substantially reduced, and in some cases reduced to zero, by absorbing or complexing of the $NO_X$ and $SO_X$ components into the waste material feedstock, where they remain absorbed, complexed or fixed in the dried or treated material exiting the dryer vessel and in the product after processing into granular, pellet or prill or other form. This provides the advantage of both lowering or eliminating the emissions of $NO_X$ and $SO_X$ (and $CO/CO_2$) into the atmosphere and adding the nitrogen, sulfur and carbon components to the nutrient value of the product produced by the process and apparatus of this invention.

The operating conditions and procedures for the dryer vessel will be apparent to one skilled in the art following the teachings herein of the disclosure of this invention. The typical turbine exhaust gas temperature entering the dryer vessel will be in the range of about 500° F. to about 1,500° F., depending on moisture and other content of the waste material feedstock and the desired condition of the fertilizer or soil builder material output from the dryer vessel. In smaller systems with smaller engines, the inlet exhaust gas temperature can be as low as about 300° F. or about 350° F. A preferred range is from about 600° F. to about 1200° F., and it is more preferred that the inlet temperature be at least about 650° F. and most preferably at least about 700° F. The temperature and flow rate of the gas entering the dryer vessel will depend in part on the moisture content and other properties of the waste material feedstock. Higher moisture content will obviously generally require higher inlet gas temperatures to reduce the moisture content. It is believed that an additional efficiency is achieved in the systems of the present invention where high moisture content waste material feedstock is contacted with high temperature gases. Such contact causes the formation, sometimes instantly, of superheated steam as the moisture comes out of the waste material feedstock, then that superheated steam heats and drives the moisture out of adjacent waste material feedstock. It is believed that this mechanism is responsible for quick drying of the waste material feedstock to a low moisture content so that the remaining residence time of the waste material feedstock in the dryer vessel contributes to the desired thermal treatment/conversion/alteration or "cooking" thereof according to this invention. Some waste material feedstocks may require lower temperatures but longer residence time to achieve the conversion or "cooking" needed to produce a product having self-binding or other desired properties. The temperature of the material exiting the dryer vessel will typically be in the range of about 150° F. to about 450° F. and preferably between about 200° F. and about 350° F. In some operations, the dryer vessel exit temperature of the material should be at least about 175° F. and preferably at least about 200° F.

The self-binding properties of the materials and products of this invention are one of the important preferred aspects of this invention. While conventional binders and additives can optionally be used to provide desired physical strength properties of the granules, pellets or prills in desired shapes and forms, it is frequently preferred that the operating conditions should be those that cook and convert the waste material feedstock to produce a self-binding product, such as an animal feed product, recyclable product, fuel product, etc. Those operating conditions will depend on the moisture content and the organic matter content of the waste material feedstock that is capable of being converted to components having binding characteristics. While not understood and not being bound by any particular theory, it is believed that starch, protein, carbohydrate and sugar components are converted to glutenous-like or other materials that can act as binders and that oil and ligand-type components are polymerized to act as binders. In any case, the operating conditions include temperatures of the exhaust gases, contact time between the waste material feedstock and exhaust gases, temperatures achieved by the feedstock solids, the residence time of the waste material feedstock solids in the dryer vessel at elevated temperatures and other process factors. These conditions will determine the temperature to which the solids will need to be raised and the length of time the solids are subjected to the elevated temperatures in order to produce a self-binding product. Such temperature may not be a constant temperature for a particular increment of solids but may be a temperature profile rising over a period of time to a maximum, then descending over a period of time or may descend rapidly if the dryer vessel output is quenched at the exit. Optimum conditions to achieve an optimum self-binding product can be determined for a particular waste material feedstock following the disclosure herein.

As used herein the term "converted material" is used to refer to and means the dried waste material feedstock which is produced in the dryer vessel by reducing the moisture content of the waste material feedstock from an existing level to a lower level according to this invention and/or achieving the chemical alterations and conversions referred to herein. The "converted material" is considered an intermediate product that is suitable for further processing into a final fertilizer product suitable for consumer, commercial or industrial use. Typically the converted material from the dryer vessel will be processed by milling to produce a powder or meal, followed by granulating, pelletizing or prilling of the powder or meal to produce the final product suitable for conventional handling, packaging and/or transport. The converted material can also be milled or otherwise powdered and made into a slurry or other liquid or pumpable product that can be recycled or used as intended. Local economics will have an impact on determining the end use to be made of the material produced from the dryer vessel or the final product produced from the system of this invention and whether the material from the dryer vessel is subjected to further processing as discussed below.

As used herein the term "granule," "granulating" and the like refer to any granular form of the material or product produced by this invention, including conventional granules, powder, dust, crumbs and the like, produced by conventional granulation processes and equipment, including crushing or crumbling previously formed pellets or prills. The term "pellets," "pelletizing" and the like refer to any pellet form of the materials or products produced by this invention, including cylindrical, bullet, spherical or other shape, typically made by conventional pelletizing processes and equipment, such as by extruding a slurry or paste and cutting, chopping, or breaking the extrudate to the desired size. The terms "prills," "prilling" and the like refer to any prill form of the materials or products produced by this invention made by conventional prilling processes and equipment, including spray tower processes, freeze drying processes, etc.

An extrusion pelletizer is one of the preferred process units for use in connection with or as part of this invention, because it takes advantage of the self-binding properties of the material produced in the dryer vessel, and because it can be operated under temperature and pressure conditions that may provide or further contribute to the "cooking" of the material to produce the basic and/or enhanced self-binding properties of the product of this invention. In a typical operation, the material from the dryer vessel is milled, and the powder or meal from the milling unit may be mixed with steam or water, for example steam or condensed water vapor from the dryer vessel, sufficient to form material that is extrudable at high pressure and temperature to form pellets or other shapes. The heating and temperatures achieved in the extrusion pellitizer may be from heated screws, dies or drums or may be from the energy of high pressure compression. In either case the extrudable material is heated to a high temperature in the process. It is believed that for some waste material feedstocks that the high temperature and pressure in the extruder pelletizer may further "cook" or convert certain components in the material to provide or contribute to additional or enhanced self-binding properties of the resulting pelletized, granulated or prilled product. Typical operating conditions for such an extrusion pelletizer will be an extrudable material having moisture content of up to about 20% by weight or higher, depending on the extruder equipment employed. Extruder temperatures and pressure will be those normally used in conventional extruder equipment. Other operating conditions can obviously be employed depending on the waste material feedstock being processed and the desired properties of the formed product. The pellets produced may be dried to reduce the moisture content to a level suitable for stable product storage, e.g., about 10% by weight. The moisture removed at this point in the process can be recycled for use in other steps and processes of the systems of this invention, as disclosed herein.

The waste material feedstock will typically have a moisture content between about 50% and about 90% by weight, preferably between about 60% and about 80% by weight and most preferably between about 65% and about 75% by weight. (Percent by weight, as used herein, is in reference to percent of the component in question based on the total weight of the mixture referred to.) Although waste material feedstock of lower moisture content, for example, as low as about 40% by weight or even 30% by weight can be processed in this invention. The preferred waste material feedstock has a moisture content of at least about 50% by weight, more preferably at least about 60% and most preferably at least about 70% by weight. When the waste material feedstock has a high moisture content in this range, processing advantages are achieved from the essentially instant production of steam and superheated steam at the inlet of the dryer vessel where the 1,000° F. exhaust gases contact the high moisture waste material feedstock at atmospheric or subatmospheric pressure. The steam and superheated steam thus produced contributes to the drying, cooking and conversion of adjacent or nearby and downstream particles of waste material feedstock, which enhances the efficiency of the process. It is preferred for operation of the process and apparatus of this invention that the waste material feedstock be mixed and blended among batches or different parts (top, bottom, indoor, outdoor, etc.) of the same batches to provide a uniformity of waste material feedstock properties. This preferred preparation enables the production of a more uniform material from the dryer vessel, and simplifies control of the process operations. The temperature of the waste material feedstock will typically be ambient, i.e., in the range of about 30° F. to about 100° F., but can be lower than 30° F., provided that any frozen agglomerations do not interfere with the feedstock preparation or the operation of the dryer vessel and feedstock feeder equipment. The waste material feedstock may be used at any temperature direct from a manufacturing facility or from a process unit, which may be at an elevated temperature. The economics of the systems of this invention are usually improved if the waste material feedstock is at an elevated temperature or is preheated prior to introduction into the dryer vessel. If preheating is used, it preferably is done just before use in this invention so composting and bioconversion are kept to a minimum. If such feedstock preheating is employed, it may be done in any desired fashion, such as heat exchanger, solar heating, heated conveyers or augers or heated concrete slabs in the staging and feedstock preparation area, and may be done with heat recovered and recycled from the process systems of this invention.

The contact time between the turbine exhaust gases and the waste material feedstock will be determined by several variables including moisture content of the feedstock, moisture content desired in the dryer vessel output material, the chemical alteration/conversion desired, volume and temperature of the exhaust gases entering the dryer vessel and other factors. The contact time will be regulated to provide not only the drying desired, but also to elevate the particles of waste material feedstock solids to sufficiently high temperatures to sufficiently destroy or convert to harmless forms, the undesirable components present in the feedstock, such as organisms, microorganisms, seeds, pesticides, antibiotics, hormones, prions, viruses and the like, when such conversion or destruction is desired, and to produce a self-binding product, when desired. The actual temperature attained by the particles is not important to determine, so long as the desired levels of said component destruction and conversion, the desired level of self-binding or other desired properties are achieved. The desired contact time can be varied and regulated by the dryer vessel volume and size and by the throughput volumes of the feedstock and exhaust gases. The heat transfer from the exhaust gases to the feedstock, and consequently the temperature to which the feedstock is heated, will mainly be a function of the mass ratio of exhaust gas to feedstock. An example of the dryer vessel operation with a gas turbine generator is a Rolls Royce Allison 501-KB5 generator (rated at 3.9 MW) having an exhaust gas output of about 122,000 lb./hr. at 1,000° F. and connected to a Scott Equipment Company, New Prague, Minn., USA, rotary tubular dryer model AST 8424 having an internal volume of about 26 cubic meters ($m^3$). The waste material feedstock is a slaughterhouse waste material comminuted to small particle size and having a moisture content of about 70% by weight and a temperature of about 65° F. and is fed to the dryer vessel at a rate of about 6,500 kg./hr., which is about 10 $m^3$/hr., (about 16,200 lb./hr.) to provide an average or nominal residence time of the solids in the dryer vessel of about 10 to about 18 minutes and a weight ratio of exhaust gases to waste material feedstock of about 7.5. The dryer vessel output is at about 200° F. The weight ratio of exhaust gas to feedstock will generally be between about 15:1 and about 1:1, preferably between about 10:1 and about 3:1 and more preferably between about 8:1 and about 4:1. The heat requirement may call for a ratio of at least about 20:1 or at least about 25:1 or higher where the feedstock is cold with a very high moisture content and the exhaust gas is not at a high or maximum temperature. The exhaust gas flow and the waste material feedstock flow through the dryer vessel may be concurrent, countercurrent, single stage, multiple stage, etc., depending on results desired and various system designs and economic considerations.

The output from the dryer vessel comprises steam, water vapor, combustion gases and solids that are dried and/or thermally treated and converted to desired forms. Typical dryer vessel outlet temperatures of the gases and/or solids will normally range from about 200° F. to about 350° F., but lower or higher temperatures may be selected and/or desired for economic, product quality and/or process efficiency reasons. The outlet temperatures can be from at least about 110° F. to at least about 500° F., preferably at least about 180° F. and more preferably at least about 200° F. It is generally desired that the solids material exiting the dryer vessel will generally have a moisture content between about 10% and about 15% by weight, but can range from about 5% to about 25% by weight. Again, lower or higher moisture content of the dryer vessel output solids may be selected and/or desired for similar reasons. The steam, water vapor and combustion gases exiting the dryer vessel will normally be routed through heat exchangers (for recovery of process heat usable downstream in granulating or pelletizing operations or upstream in feedstock or turbine intake air preheating), condensers (for recovery of process water for upstream or downstream use, for agricultural application or for disposal), scrubbers, filters or cyclones (for recovering solids entrained in gases or liquids and rendering gases and liquids environmentally acceptable for release) and other conventional process equipment.

The solids output from the dryer vessel, referred to herein as converted material, are typically further processed by milling, granulating, pelletizing, prilling or other processing to produce a final feed, fuel, recycle or other product in the form desired for packaging or bulk distribution, transport and use. Such milling, granulating, pelletizing or prilling equipment and operations useful in this invention are those that are conventional and well-known, since the output from the dryer vessel comprises solid and vapor components that lend themselves to such processing. Whatever the product in whatever form, the process, system and equipment of this invention provide for environmentally and economically effective processing of waste material feedstocks to remove them as environmental liabilities and provide products which are commercially useful, and to eliminate disposal in a municipal sewer or landfill. This invention can be used to produce a variety of products and materials from waste material feedstocks, but the preferred materials and products are those that have no significant undesirable components remaining that have not been converted or destroyed in the heating, chemically altering and/or drying treatment in the dryer vessel or other operations. The products and materials produced by this invention are preferred to be useful feed, fuel, recyclable or other products, but this invention is also useful in producing reduced-volume solids for disposal in landfill with the advantage of providing solids having low levels or no amounts of harmful components to leach out from the landfill into surface or ground water.

The products and materials produced by this invention are useful for and include blends with other materials, products or chemicals, as may be desired for particular end uses requiring particular properties or characteristics. Such other materials and additives can be added and blended at any appropriate point in the process: blended with the waste material feedstock, added to the dryer vessel, added in the process water at any point, added to the material exiting the dryer vessel, added as part of any milling, granulating or pelletizing processing or simply mixed with the final product or blended in before bagging or packaging or at the point of use. For example the final products, while usually relatively odor free, can be blended with other materials that can either provide a pleasant odor or mask any unpleasant odor. Such materials can be synthetic (perfumes) or natural, with natural materials being preferred. Natural, organic materials can include sage, mint, fennel, garlic, rosemary, pine, citrus and similar materials that would not prevent certification as an organic input. Other materials for blending can include iron, minerals, carbon, zeolite, perlite, chemical fertilizers (urea, ammonium nitrate, etc.), pesticides and other materials to adapt the product for specialized use.

The systems of this invention include configurations that can be used to reduce and in some operations essentially eliminate the emission into the atmosphere of noxious odors and greenhouse gases from manufacturing operations, from various processing facilities, and from composting or organic waste material, referred to herein as "emissions gases." Manufacturing operations are coming under increasing regulation by federal and state agencies due to increasing pressure from population areas near the manufacturing operations. The regulation is directed to two aspects of air quality. The first is noxious odors in emissions gases, which contain mercaptans and many other organic compounds that have offensive odors and which are objectionable to residential communities. The second is greenhouse gas emissions that are harmful to air quality. Greenhouse gases include $CO_2$, $CH_4$, and $N_2O$ and are usually referred to in terms of $CO_2$ equivalent effect on the atmosphere. Methane (commonly released from composting waste material stockpiles or lagoons) has a $CO_2$ equivalent factor of about 23 (as used by the USDOE) which means that 1 kg of $CH_4$ released into the atmosphere is equivalent to 23 kg of $CO_2$ released. (Some sources give the equivalent factor as about 21.) While $CH_4$ is the main greenhouse gas produced by bioconversion of organic waste material, $CO_2$ and $NO_x$ gases are also produced. It is particularly desired to prevent $NO_x$ release into the atmosphere, because it is estimated to have a $CO_2$ equivalent of about 310. This invention can be used, as disclosed herein, to essentially eliminate atmospheric release of emission gases by containing and processing the emission gases, by immediate processing of waste material feedstock to prevent decomposition or bioconversion of organic matter and/or containing and processing emissions from decomposition or bioconversion that takes place before the waste material feedstock can be processed.

The systems of this invention are particularly useful in essentially eliminating the release of emission gases from manufacturing operations. In the basic system of this invention, the gas turbine exhaust is connected to the dryer vessel. To control emission gases produced in a manufacturing operation, the gas turbine air intake is connected to the manufacturing facility ventilation system so that the ventilation air exhausted from the facility is directed into the gas turbine air intake where two processes normally will take place. First, the emission gases are burned along with the regular gas turbine fuel supply, thereby converting the $CH_4$ to $H_2O$ and $CO_2$ and converting the mercaptans and other noxious or acrid compounds to $H_2O$, $CO_x$, $NO_x$ and $SO_x$. Second, the exhaust gases from the gas turbine are contacted with the waste material feedstock, where the $NO_x$ and $SO_x$ and to some extent $CO_x$ gases are absorbed into or complexed with the waste material feedstock as it is dried and/or thermally treated to form a converted material, and preferably to form a final product. This aspect of this invention prevents the emission gases from entering the atmosphere.

Existing manufacturing facilities that can immediately directly and efficiently utilize this invention for control of emission gases are those that are normally completely enclosed and ventilated by fresh air inlets and exhaust air outlets, and particularly those that are climate controlled by heating and air conditioning. The exhaust air from such facilities is directed to the gas turbine combustion air inlet. In addition, facilities can be economically enclosed (e.g. by canvas walls) and ventilated by forced air (with or without climate control) to collect essentially all the emission gases from the manufacturing operation and directing the exhaust vent air to the gas turbine air intake.

In utilizing this aspect of this invention it will be recognized that it is preferably operated so that all the ventilation air exhausted from the manufacturing facility is fed to the gas turbine air intake to prevent release of emission gases to the atmosphere. Any remaining combustion air needed for the gas turbine will be from ambient air through a conventional air filter, although it is preferred that the facility exhaust vent air also pass through the gas turbine intake air filter to prevent damage or erosion of turbine components by entrained dust or other particles. The solids collected in the air filter can be fed to the dryer vessel or to other process units in the system for incorporation into the final product produced by the systems of this invention. Although the methane or other oxidizable gases in the emission gases will not normally constitute a significant portion of the fuel requirements of the system of this invention, it is burned to produce heat and is not released to the atmosphere. Nevertheless, every kg of emission gas burned reduces the outside gas turbine fuel requirement by an equivalent kg. This aspect of the invention also provides the benefit of turbine inlet noise control. Similar to the dryer vessel acting as a silencer for the turbine exhaust, having the turbine inlet enclosed and air ducted in a closed system from the manufacturing facility substantially contains and muffles the high frequency turbine inlet noise.

It will also be recognized that, while the above description is in terms of using a gas turbine, the same utilization of this aspect of this invention to control emission gases can be made using whatever heat source is selected for use in the system. Whether the heat source is a gas turbine, gas turbine generator, reciprocating gas or diesel engine or even a conventional oil or gas burner (like 107 in FIG. 1), the manufacturing facility exhaust vent air can be directed to the combustion air intake so the emission gases are burned and preferably so the combustion gases are contacted with the waste material feedstock.

As further disclosure and illustration of the processes, systems and equipment of this invention, reference is made to the schematic flow chart of FIG. 1. In the exemplary process illustrated, gas turbine generator unit 100 comprises gas turbine 101 and electric generator 102. The gas turbine has air intake filter 104 and fuel feed 103. If desired, optional bypass exhaust silencer 106 can be included for startup, shutdown or upset conditions during those times the gas turbine is running but the exhaust gases cannot be directed into the dryer vessel. However, dryer vessel 200 will function as the silencer in the normal operation of the system of this invention. Alternatively, instead of silencer 106, the exhaust gas bypass (see 908 in FIG. 5) around the dryer vessel can be directed to any appropriate downstream unit, such as separator 208 and/or separator 600, which can provide a temporary silencer function. This arrangement eliminates the cost of a separate silencer and the space required for a separate silencer, which is an important consideration for the portable, truck-mounted systems. The gas turbine 101 exhaust is connected to the dryer vessel 200 by connector 105. An optional air inlet (not shown) can be included for dryer vessel 200 in connector 105 or elsewhere for purging the dryer vessel or the system, for startup or shutdown or for other reasons, particularly when either the exhaust gases or the waste material feedstock is not present in the dryer vessel 200. However, when both are present, any such air inlet is closed and not used in order to substantially preclude introduction of air into the dryer vessel and to preclude significant oxidation of materials being processed in the dryer vessel 200. Optional burner 107 can also be included to provide supplemental heat source and combustion gases for the dryer vessel, which can be provided for input in connector 105 or elsewhere. The optional supplemental heat source may be useful during startup, shutdown, process upset, turbine outage or to maintain desired throughput when a peak load or unusually high water content feedstock is encountered.

The waste material feedstock is typically introduced into the system by mechanical means, such as pump, auger or whatever is appropriate for a particular feedstock. In this illustration and example, a front end loader 201, drops a solid waste feedstock into a rock separator, mixer, chopper unit 202. The feedstock can be further mixed and foreign objects separated in screw conveyers 203, 204 then fed to the dryer vessel 200 through 215. The feedstock can also be pre-mixed or conditioned for desired uniformity prior to loading into this system by loader 201, e.g., in storage windrows that can be combined and mixed.

The output from the dryer vessel 200 is transferred by conduits 205, 206 to separator 208 where the solids and gases are separated. The gases pass through 209 and blower 210 to the atmosphere via 211 or to other downstream processing via 212. Blower 210 can be operated to lower the pressure in separator 208 and in the dryer vessel 200, which will reduce the water boiling point in the dryer vessel and will reduce the water boiling point in the dryer vessel and will reduce the backpressure on the turbine exhaust and increase the turbine output and efficiency. Alternatively, blower 210 can be operated to maintain increased pressure in dryer vessel for higher temperature treatment, conversion or "cooking" of the waste material feedstock is desired. The output from dryer vessel 200 can pass through optional heat exchanger 207 for recovery of process heat for use downstream or in preheating the waste material feedstock or turbine intake air. The solids output from separator 208 pass to ball mill or hammer mill 300 via conduit, conveyor or auger 301 and optional mixers and conditioners 302 and 303. In addition, recycled solids, such as fines, from recycle loop 305 can be mixed in at 303 via 304 to be combined for feeding to the ball mill or hammer mill 300. The fines and off spec material generated at various points in the system can be collected and recycled via loop 305 and reintroduced into the product processing system at any desired point for further processing, such as the milling unit 300 via 304, the pelletizing unit 400 via 404 or even the waste material feedstock preparation 202, 203, 204 or other points. An important capability of the system of this invention is the complete recycle via recycle loop 305 of all fines or off spec solids so that they are eventually incorporated in the final products. Thus, the system of this invention provides 100% conversion of the waste material feedstock solids (except for rocks and other foreign objects that are not processible) into the final products and does not produce a solids waste stream that must be otherwise disposed of, such as in a landfill.

The ball mill or hammer mill 300 is used to produce a uniform small particle size, short fiber length material called "meal" which is suitable for processing in pelletizer unit 400 to provide a product that has sufficient hardness and mechanical durability and stability for the conventional processing, packaging and storage normally used for dry products. The output of ball mill or hammer mill 300 goes through separator 310 where vapors are taken off and sent via 315 to separator 600 for recycle of solids via recycle loop 305 and venting of vapors to the atmosphere via blower 601 and vent 602. Separator 310 takes out fines or material suitable for recycle via recycle loop 305 and passes the meal to mixer 311. The meal is then sent via 312 to separator 401 and either direct to pelletizer 400 via 408 or to holding or surge bin 402 via 409a and 409b for mixing with other materials, recycle materials from 404 or additives or for holding in case of process startup, shutdown or upset. From surge bin 402 the meal is sent through mixer 403 and either directly to the pelletizer unit 400 via 417 or to mixer 311 via 412 for mixing with fresh meal when desired.

The pellets from pelletizer 400 are passed through heat exchanger, vapor removal unit 405 and from there sent via 406 and 414 either direct to final product cleaning in units 407 and 415 and finished product shipping or storage bin 500 via 416a, 416b, 501 and 503, or sent via 413 and surge bin 410 to a crumbler or granulator unit 411 then to final product cleaning units 407 and 415. The final product is loaded in truck 502 via 501, 503 or via storage bin 500 for transport to market. The fines and off spec product separated out in final cleaning unit 415 can be recycled for reprocessing via recycle loop 305. The crumbler or granulator 411 converts the pellets to smaller particle or granular size having essentially the same hardness and mechanical durability and stability as the pellets. The solids can be transported between processing units of this invention by conventional augers, elevators, conveyor belts, pneumatic tube conveyors and the like, as appropriate for the material and for environmental considerations. As is apparent, the system can be designed and configured to produce a material or product from dryer vessel 200 (that can be baled for direct use), meal from mill unit 300 (that can be bagged for later processing or for direct use) or a granular product, a pellet product or a prill product from 415.

An example of the operation of the system according to this invention can be seen from the following table. This example is based on the use of a Rolls Royce Allison 501-KB5 (rated at 3.9 MW) gas turbine generator and a Scott Equipment Co. dryer model AST 8424 processing slaughterhouse waste material to produce a protein source animal feed product.

1. Example of System Sized for Nominal 2.5 Metric Tons/Hr Finished Product

| FIG. 1 Stream No. | Component | (a) Flow Rate | Condition |
|---|---|---|---|
| 103 | Natural Gas | 820 kg/hr | Ambient Temp. |
| 104 | Combustion Air | 48,140 kg/hr | Ambient Temp. |
| 105 | Exhaust Gases | 48,960 kg/hr | 1,200° F. |
| 215 | Waste Material Feedstock | 6,500 kg/hr | 70% $H_2O$/ Ambient Temp. |
| 200 | Residence Time | 10-18 min. | |
| 301 | Dried Material | 2,730 kg/hr | 12% $H_2O$ by wt. 200° F. |
| 312 | Meal | 2,500 kg/hr | 10% $H_2O$ by wt. 125° F. |
| 503 | Pelletized Animal Feed Product | 2,500 kg/hr | 12% $H_2O$ by wt. 15° F. above Ambient Temp. |

Figure 2:
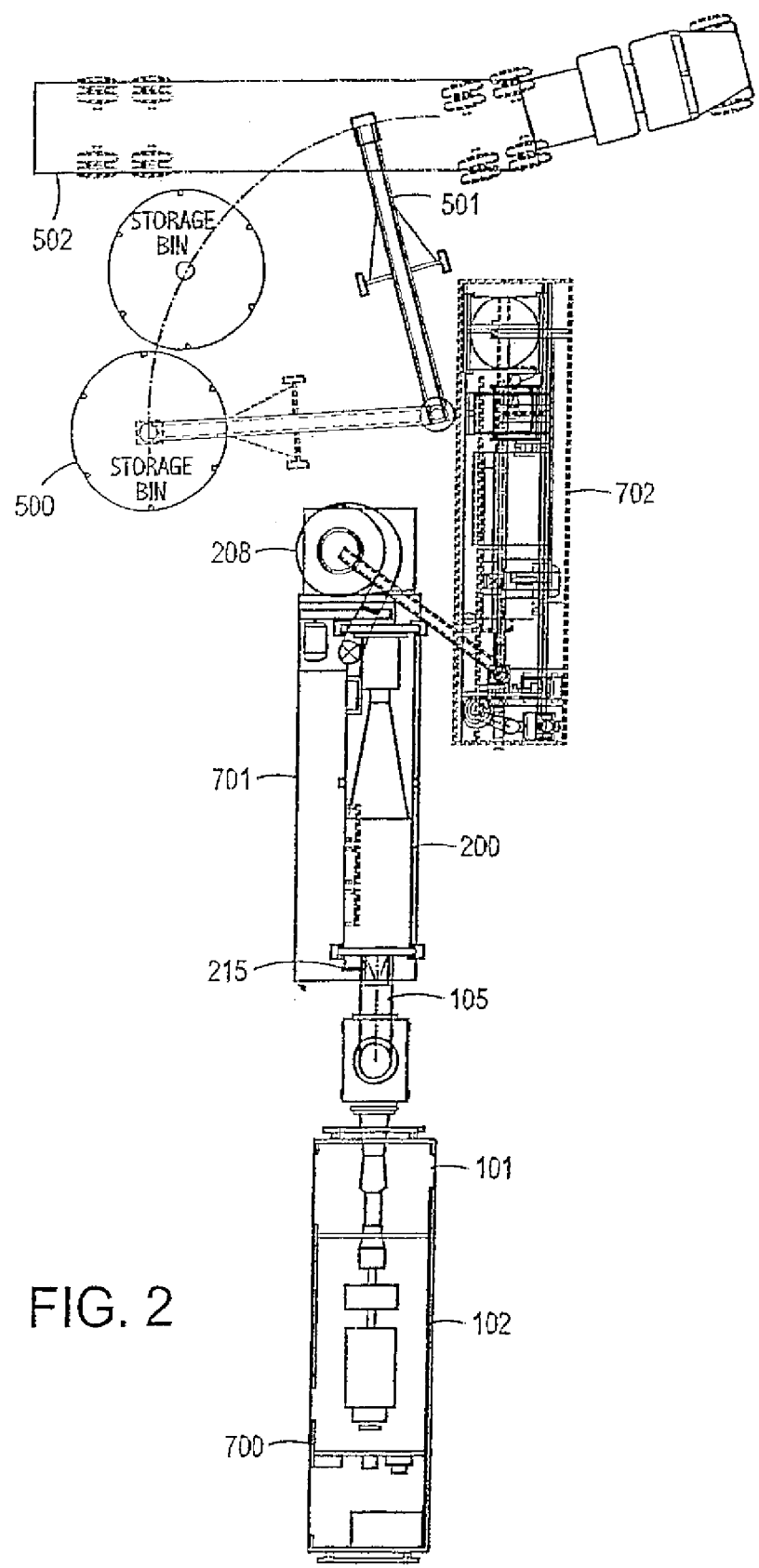
FIG. 2 is a plan view of the process units according to this invention in the form of portable skid-mounted, truckable units.

FIG. 2 illustrates one configuration of the system of this invention in the form of skid-mounted, truck mounted or rail car mounted units that can be transported to and operated at desired manufacturing operation sites where waste material feedstock is available on a daily or periodic basis. The first unit 700 comprises the gas turbine 101 and generator 102. The second unit 701 comprises dryer vessel 200 and separator 208. The dryer vessel 200 has waste material feedstock inlet 215 and is connected to the gas turbine exhaust by connector 105 when stationary and in operation. The third unit 702 comprises the processing equipment desired for a particular operation, such as the ball mill and pelletizer. The product output is conveyed by 501 to storage units 500 or to truck 502 for transport to market. Optional equipment can also include units for bagging and other packaging of the final product for various markets.

Figure 3:
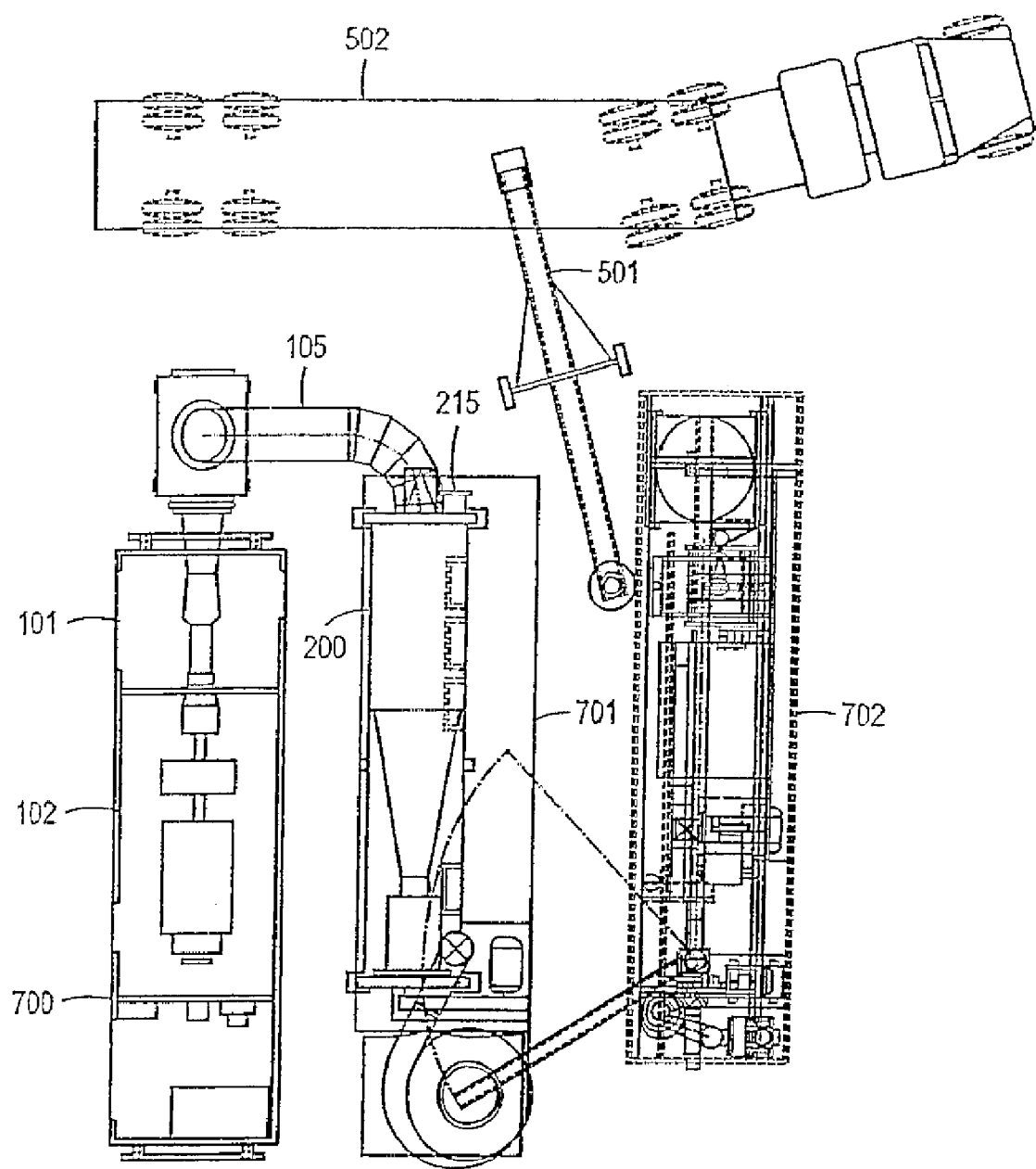
FIG. 3 is a plan view of the process units according to this invention in the form of portable skid-mounted, truckable units in another configuration.

FIG. 3 is an illustration of the same units as in FIG. 2, but positioned on the operation site in a different configuration. It is apparent that the portable, truck-mounted units of this invention are adaptable to a variety of sites that may have limitations on space available.

FIG. 4A is a plan view and FIG. 4B is an elevation view of another portable configuration of the system of this invention wherein all operating units are mounted on a single semi-trailer truck 800a and 800b. Gas turbine unit 100 exhaust is connected to dryer vessel 200 by connector 105. Dryer vessel 200 has waste material feedstock inlet 215 and is connected to separator 208 by conduit 206. Separator 208 is connected to vapor/air cleaner separator 600 by conduit 209 and separator 600 vents to the atmosphere by vent 602. The bottom outlet of separator 208 is connected via conduit 301 to ball mill unit 300. The outlet of ball mill unit 300 is connected via conduit 312 to pelletizer unit 400, which is connected to product cleaning unit 415 by conduit 414. Cleaning unit 415 has product outlet 416. Not shown in FIGS. 2, 3 and 4 is an optional enclosure for each skid-mounted or truck-mounted unit to enclose the entire unit for weather protection and for noise attenuation.

Figure 5:
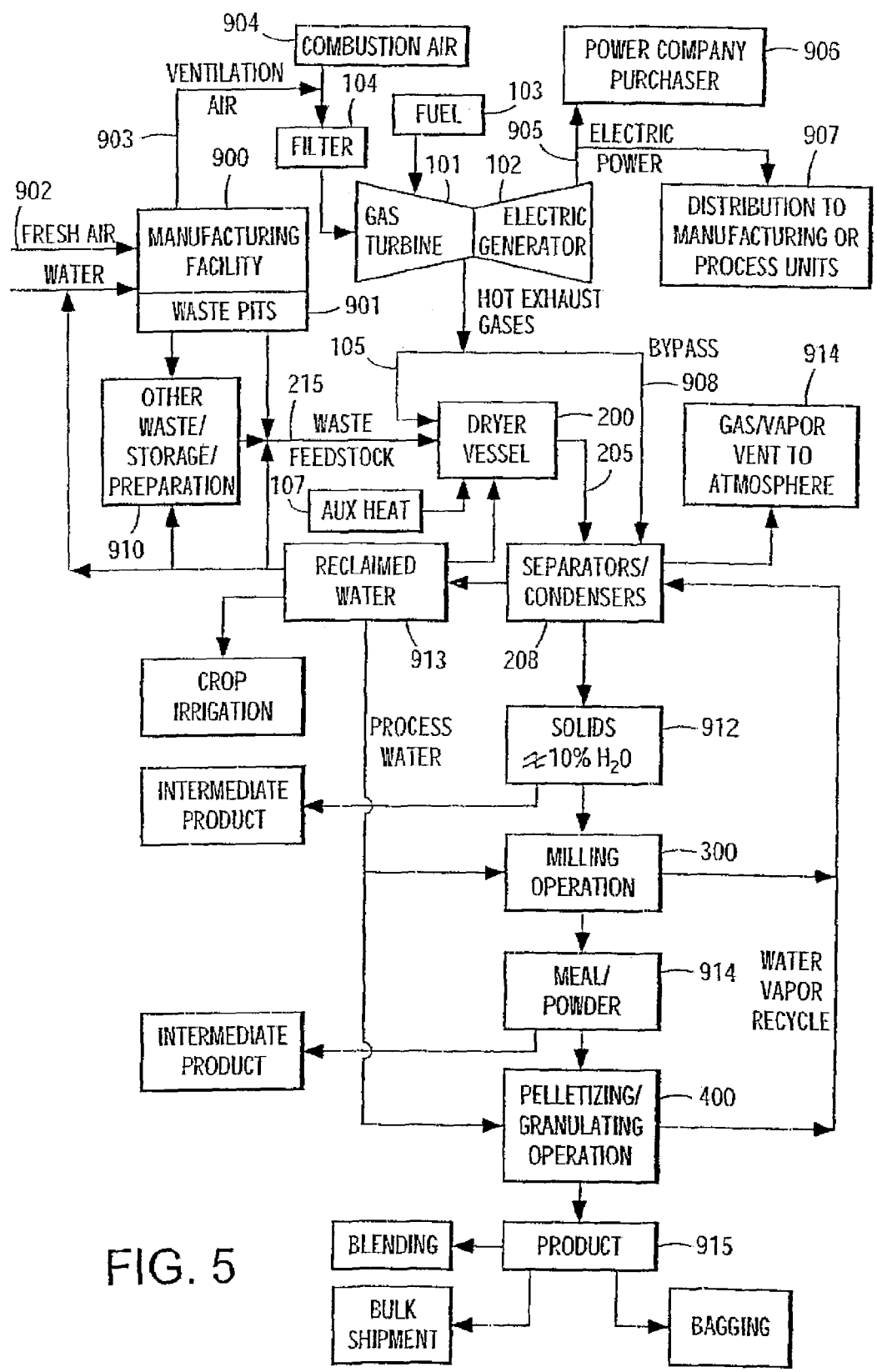
FIG. 5 is a schematic of processes for preventing emission of greenhouse, noxious odors and other gases to the atmosphere using the systems of the present invention.

FIG. 5 is a schematic process flow chart of some of the optional systems of this invention. Manufacturing facility enclosure 900 and waste material pits 901 are enclosed and ventilated with fresh air 902. The ventilation air 903 from the facility is fed to the gas turbine 101 as part of the combustion air feed 904 through air filter 104. The waste material pits 901 can be within the same enclosure or can be separate holding tanks or lagoons that are enclosed so that all vapors given off by the waste material can be contained and passed to the gas turbine 101 along with the facility ventilation air 903 for combustion along with the conventional gas turbine fuel 103, such as locally available natural gas. This prevents greenhouse and noxious or acrid gases from the manufacturing operation and the waste material from being released into the atmosphere, including biogases from any bioconversion that takes place before the waste material can be processed in the system of this invention. Not only does this provide the opportunity for commercial use of this invention to obtain air quality credits for reduced greenhouse gas emissions, it also provides manufacturing operations a way to become acceptable neighbors with nearby residential areas, because all noxious and acrid odors from the operation and the waste material can be contained within the system and incorporated in the final product or converted to components that are not noxious or acrid before venting to the atmosphere.

The gas turbine generator 101/102 produces electric power 905, which can be either sold to the local power company 906 or distributed by 907 for use in the manufacturing operation or the processing units in the systems of this invention. Some manufacturing operations will find that the cost of enclosing an open manufacturing facility and installing and operating ventilation in order to contain and process all greenhouse gases via 903 can be at least partially if not substantially offset by using the electricity 905 for operation of the ventilation system. For example, it may be feasible, or necessary in some instances due to governmental regulation, to cover a normally open manufacturing operation with inflatable tents, similar to those used for tennis courts, to provide economical systems for containing and collecting all emission gases from such an operation, so those gases can be processed via 903 according to this invention. The economics of each commercial operation, fuel costs, selling price/purchase price of electricity and capital cost of equipment will determine whether the electricity is used internally in the manufacturing operation, sold to the power company, used in the systems of this invention or used in other nearby operations or any combination thereof.

The exhaust gases from the gas turbine 101 are passed to dryer vessel 200 by a connection 105 that precludes outside air from entering the dryer. As disclosed herein, the system is operated so that the oxidation of the waste material feedstock in the dryer vessel 200 and elsewhere in the system is minimized and substantially avoided. The dryer vessel 200 also serves as silencer for the gas turbine. An optional bypass 908 can be provided so the exhaust gases can be sent to downstream equipment, such as separators/condensers 208, to silence the gas turbine exhaust when the dryer vessel is off line and to clean the exhaust gases before release into the atmosphere during such temporary operation. This bypass eliminates the cost of having a separate silencer to satisfy noise restrictions on the gas turbine when the dryer vessel is off line and provides a more compact design for portable or truck mounted units.

Waste material feedstock 215 is fed to the dryer vessel 200 along with the exhaust gases from connection 105 and any auxiliary heat provided from alternate or auxiliary heat source 107. The waste material feedstock preferable comes directly from the waste material pits 901 in facility 900 so it is fresh and has little or no time for bioconversion. Other waste material feedstock sources 910 can be used or included in the system, such as stockpiled waste material or waste material from other operations that is brought in to be combined or mixed with the waste material from the immediate facility. As disclosed herein, other green waste, organic materials, inorganic materials or additives can be combined with the waste material for processing in the system of this invention.

The output from dryer vessel 200 is sent via 205 to the separators/condensers designed to separate the solids 912 for further processing downstream, to condense the water vapors as reclaimed water 913 and to clean the gases 914 vented to the atmosphere. The reclaimed water can be used downstream as process water, recycled for use in the manufacturing facility or preparing or conditioning the waste material feedstock, used for livestock water or used for crop irrigation. The solids output 912 from the separator units 208 is normally further processed by milling, pelletizing, granulating, bagging, etc. However, the solids 912 can be used as an intermediate to form other types of products. For example, the dry material can be baled, formed into shapes, slurred for pumping, or can be used alone or in combination with other materials for incineration to utilize the fuel value of the material.

In each of the downstream operations, water vapor may be recovered and recycled to the separators/condensers 208 for reuse. As is apparent, the systems of this invention are adaptable to various configurations and various designs depending on the processing needs and economics of particular animal feeding operations. Various conventional heat recovery and recycle aspects, not shown in FIG. 5, can be designed into commercial installation of the systems of this invention by using ordinary process engineering design skills, including the fines recycle 305 shown in FIG. 1, use of gas/vapor stream 914 for various heat recovery and pre-heating applications, insertion of binders, additives and blending materials at various desired points in the system, cooling the combustion air and/or facility ventilation air, e.g., by water spray, to increase efficiency and power output of the gas turbines, dewatering very high water content waste material feedstock, etc. The final pelletized, granulated or prilled product 915 can be bagged or shipped bulk for conventional handling, transport and end use.

As will be apparent to one skilled in the art, multiple gas turbines, other engines and/or burners of the same or varying types and sizes can be manifolded together to feed multiple dryer vessels of the same or varying types and sizes in a single installation. This can be done to not only provide increased feedstock processing capacity but also to provide operation flexibility for processing varying feedstock loads and for performing equipment maintenance without shutting down the operation.

While we have illustrated and described various embodiments of this invention, these are by way of illustration only and various changes and modifications may be made within the contemplation of this invention and within the scope of the following claims.

We claim:
1. A method for producing a dried product from a waste material feedstock comprising:
   operating a gas turbine generator to produce electricity and exhaust gases;
   providing waste material feedstock having a moisture content of at least about 30% by weight;
   directly contacting the exhaust gases flowing from the gas turbine with the waste material feedstock having a moisture content of at least about 30% by weight, in a rotary dryer for a contact time sufficient to produce a dried material having a moisture content less than about 20% by weight, wherein the gas turbine exhaust gases do not pass through an intermediate heat exchanger as the gas turbine exhaust gases flow from the gas turbine to the rotary dryer;
   passing the dried material output from the rotary dryer through a solids/gas separator to separate the solids and the gases, wherein the gases separated by the solids/gas separator are released to the atmosphere through a first path and the solids separated by the solids/gas separator are conveyed for further processing through a second path;

drawing air from the rotary dryer with an air moving device to reduce pressure in the rotary dryer;

adding moisture to the solids conveyed from the solids/gas separator to re-moisturize the solids; and processing and forming the re-moisturized solids through an extrusion process into a granular, pellet or prill form of product suitable for conventional handling, transport or use, wherein the solids are re-heated during the extrusion process.

2. A method according to claim 1 wherein the waste material feedstock comprises a moisture content of at least about 50% by weight.

3. A method according to claim 2 wherein the moisture content is at least about 70% by weight.

4. A method according to claim 1 wherein the dried material comprises a moisture content less than about 15% by weight.

5. A method according to claim 1 wherein the product comprises a moisture content less than about 10% by weight.

* * * * *